(12) United States Patent
Burbidge et al.

(10) Patent No.: US 9,974,049 B2
(45) Date of Patent: May 15, 2018

(54) ADAPTIVE PAGING TECHNIQUES FOR EXTENDED COVERAGE-CAPABLE DEVICES

(71) Applicant: INTEL IP CORPORATION, Santa Clara, CA (US)

(72) Inventors: Richard C. Burbidge, Shrivenham (GB); Marta Martinez Tarradell, Hillsboro, OR (US); Youn Hyoung Heo, Seoul (KR); Hyung-Nam Choi, Hamburg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/976,736

(22) Filed: Dec. 21, 2015

(65) Prior Publication Data
US 2016/0227514 A1 Aug. 4, 2016

Related U.S. Application Data

(60) Provisional application No. 62/109,501, filed on Jan. 29, 2015.

(51) Int. Cl.
*H04W 68/08* (2009.01)
*H04W 76/04* (2009.01)
(Continued)

(52) U.S. Cl.
CPC .......... *H04W 68/08* (2013.01); *H04W 16/26* (2013.01); *H04W 68/02* (2013.01);
(Continued)

(58) Field of Classification Search
CPC ... H04W 68/02; H04W 68/025; H04W 68/08; H04W 68/04; H04W 68/12; H04W 76/046; H04W 16/26
(Continued)

(56) References Cited

U.S. PATENT DOCUMENTS

2012/0300655 A1* 11/2012 Lee ........................ H04W 24/00
370/252
2013/0083650 A1* 4/2013 Taleb ...................... H04W 8/30
370/218

(Continued)

OTHER PUBLICATIONS

Office Action and Search Report received for Taiwanese Patent Application No. 104143374, dated Dec. 12, 2016, 19 pages.
Ericsson, "Common control messages for MTC", 3GPP TSG-RAN WG1 Meeting #78bis, R1-143789, Oct. 6-10, 2014, 6 pages.

*Primary Examiner* — Inder Mehra

(57) ABSTRACT

Adaptive paging techniques for EC-capable devices are described. In one embodiment, for example, an apparatus may comprise at least one memory and logic for an evolved node B (eNB), at least a portion of the logic comprised in hardware coupled to the at least one memory, the logic to receive an S1 paging message comprising a user equipment (UE) identifier (ID) associated with a UE and an extended coverage (EC) capability indicator indicating that the UE is EC-capable and page the UE using an EC paging sequence based on receipt of the S1 paging message, the EC paging sequence to comprise a series of transmissions of a radio resource control (RRC) paging message, the logic to truncate the EC paging sequence based on a determination that the UE has responded to RRC paging. Other embodiments are described and claimed.

25 Claims, 13 Drawing Sheets

(51) Int. Cl.
- *H04W 16/26* (2009.01)
- *H04W 68/02* (2009.01)
- *H04W 8/22* (2009.01)
- *H04W 68/04* (2009.01)
- *H04W 68/12* (2009.01)

(52) U.S. Cl.
CPC ............ *H04W 76/046* (2013.01); *H04W 8/22* (2013.01); *H04W 68/04* (2013.01); *H04W 68/12* (2013.01)

(58) Field of Classification Search
USPC ........................................................ 340/7.63
See application file for complete search history.

(56) References Cited

U.S. PATENT DOCUMENTS

| | | | |
|---|---|---|---|
| 2014/0098761 A1 | 4/2014 | Lee et al. | |
| 2014/0128110 A1 | 5/2014 | Wang et al. | |
| 2015/0018002 A1* | 1/2015 | Touag | H04W 16/14 455/454 |
| 2015/0036589 A1* | 2/2015 | Piercy | H04W 8/20 370/328 |
| 2016/0174188 A1* | 6/2016 | Kim | H04W 68/02 455/458 |
| 2016/0205659 A1* | 7/2016 | Bergman | H04L 1/1812 370/252 |
| 2017/0374644 A1* | 12/2017 | Ryu | H04W 68/02 |

* cited by examiner

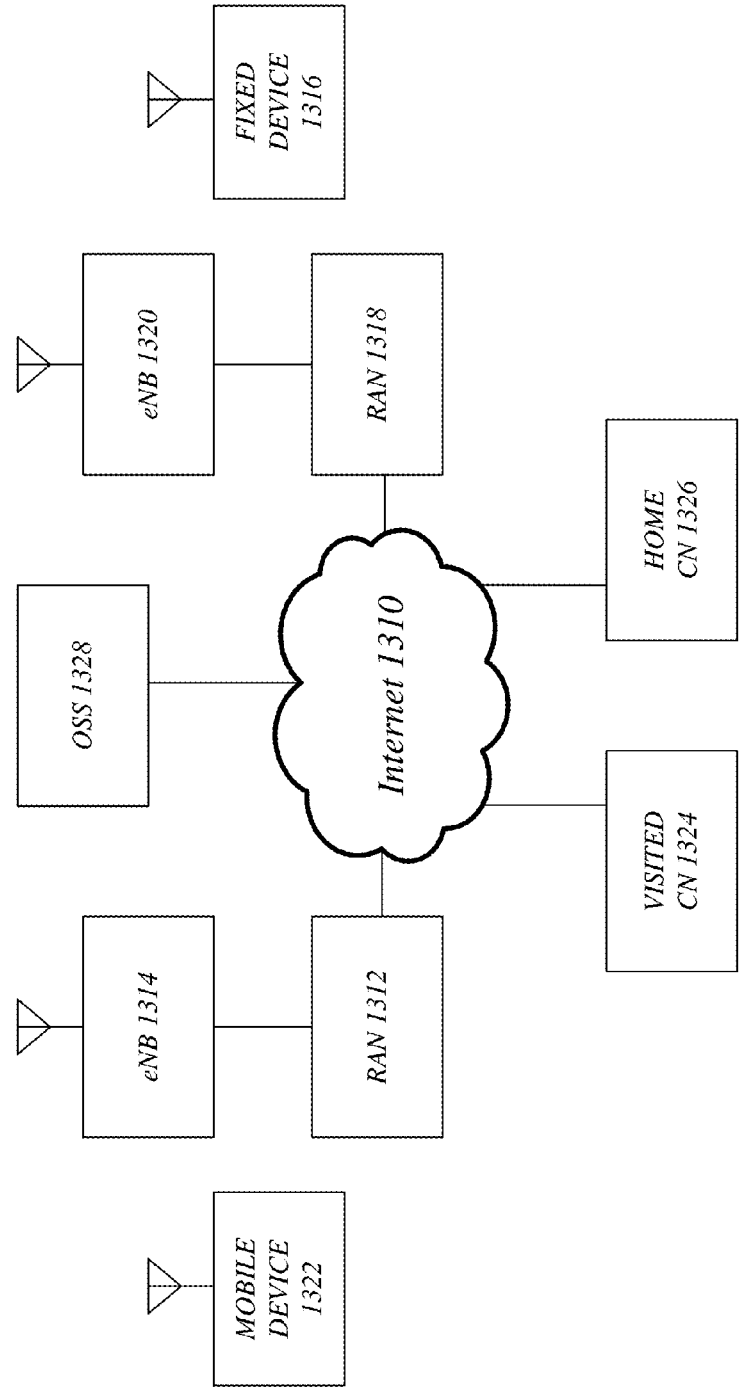

ADAPTIVE PAGING TECHNIQUES FOR EXTENDED COVERAGE-CAPABLE DEVICES

RELATED CASE

This application claims priority to U.S. Provisional Patent Application No. 62/109,501, filed Jan. 29, 2015, the entirety of which is hereby incorporated by reference.

TECHNICAL FIELD

Embodiments herein generally relate to communications between devices in broadband wireless communications networks.

BACKGROUND

For 3rd Generation Partnership Project (3GPP) 3GPP Release 13, a work item has been agreed upon to introduce a new UE category featuring even lower capabilities (and thus, presumably, lower associated costs) that those associated with the Category 0 added in Release 12. In addition, the work item aims to introduce an Extended Coverage (EC) feature, according to which the E-UTRAN link budget may be increased by up to 15 dB in order to enable communications with UEs in locations—such as the inner recesses of large buildings, for example—at which coverage would not otherwise be available.

BRIEF DESCRIPTION OF THE DRAWINGS

FIG. 13 illustrates an embodiment of a wireless network.

DETAILED DESCRIPTION

Figure 1:
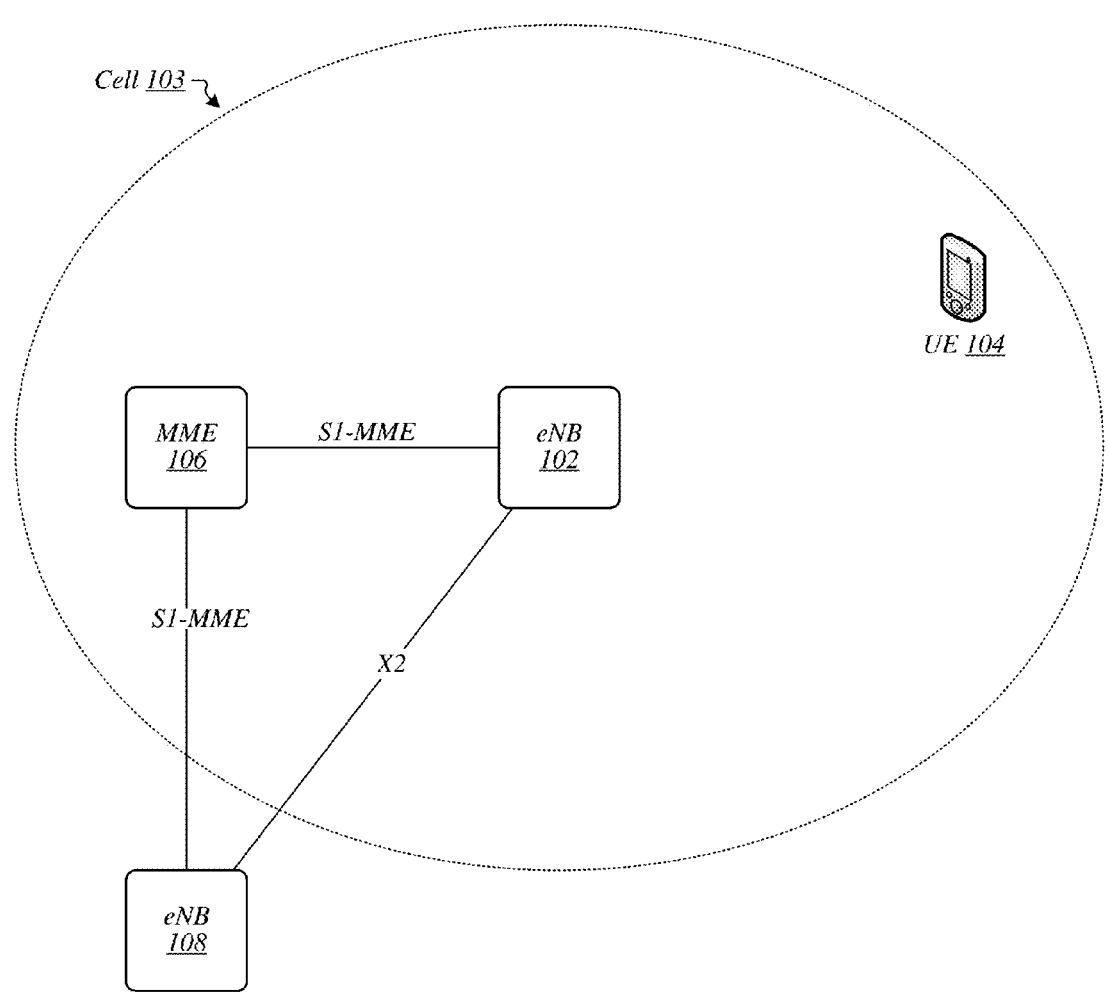
FIG. 1 illustrates an embodiment of a first operating environment.

Various embodiments may be generally directed to adaptive paging techniques for EC-capable devices. In one embodiment, for example, an apparatus may comprise at least one memory and logic for an evolved node B (eNB), at least a portion of the logic comprised in hardware coupled to the at least one memory, the logic to receive an S1 paging message comprising a user equipment (UE) identifier (ID) associated with a UE and an extended coverage (EC) capability indicator indicating that the UE is EC-capable and page the UE using an EC paging sequence based on receipt of the S1 paging message, the EC paging sequence to comprise a series of transmissions of a radio resource control (RRC) paging message, the logic to truncate the EC paging sequence based on a determination that the UE has responded to RRC paging. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 that may be representative of various embodiments. In operating environment 100, an evolved node B (eNB) 102 serves a cell 103. User equipment (UE) 104 is located within cell 103, and is provided with wireless connectivity by eNB 102. A mobility management entity (MME) 106 is responsible for managing paging procedures in a tracking area that includes the cell 103 served by eNB 102, as well as a second cell (not pictured) that is served by an eNB 108. In various embodiments, MME 106 may be capable of exchanging communications with eNBs 102 and 108 over respective S1-MME interface connections with eNBs 102 and 108. In various embodiments, eNBs 102 and 108 may be capable of exchanging communications with each other over an X2 interface connection. The embodiments are not limited in this context.

In some embodiments, UE 104 may operate with limited reception capabilities, limited transmission capabilities, limited data rate capabilities, and/or other types of limited capabilities. In various such embodiments, UE 104 may operate as a defined type of reduced-capability UE. In various embodiments, for example, UE 104 may operate as a UE of the reduced-capability Category 0 (Cat-0) type that was introduced in 3GPP Release 12, or of the category featuring further-reduced capabilities—referred to herein as Category M (Cat-M)—that is currently under discussion for incorporation into 3GPP Release 13. The term "limited-capability type (LCT) UE" is employed herein to denote a UE that operates with limited capabilities, such as a UE that operates as a Cat-0 or Cat-M UE. It is worthy of note that in various embodiments, an LCT UE may comprise a UE that selects to operate in an LCT mode—such as a Cat-0 or Cat-M mode—even though it is capable of operating in one or more modes that do not impose the capability limitations associated with that LCT mode. For example, in some embodiments, UE 104 may operate as a Cat-0 or Cat-M UE despite being capable of operating as a Category 6 (Cat-6) UE. The embodiments are not limited to this example.

In operating environment 100, if UE 104 is an LCT UE, it may be desirable that notification of this fact be provided to radio access network (RAN) devices that may attempt to communicate with UE 104, so that such devices can take the capability limitations of UE 104 into account in conjunction with attempting such communications. For example, if UE 104 is operating as a Cat-0 UE, it may be desirable that eNB 102 be aware of this fact so that it may consider compensating for UE 104's limited reception capabilities by using a more reliable modulation-and-coding scheme (MCS) or higher transmission power when transmitting paging messages to UE 104. The embodiments are not limited to this example.

Figure 2:
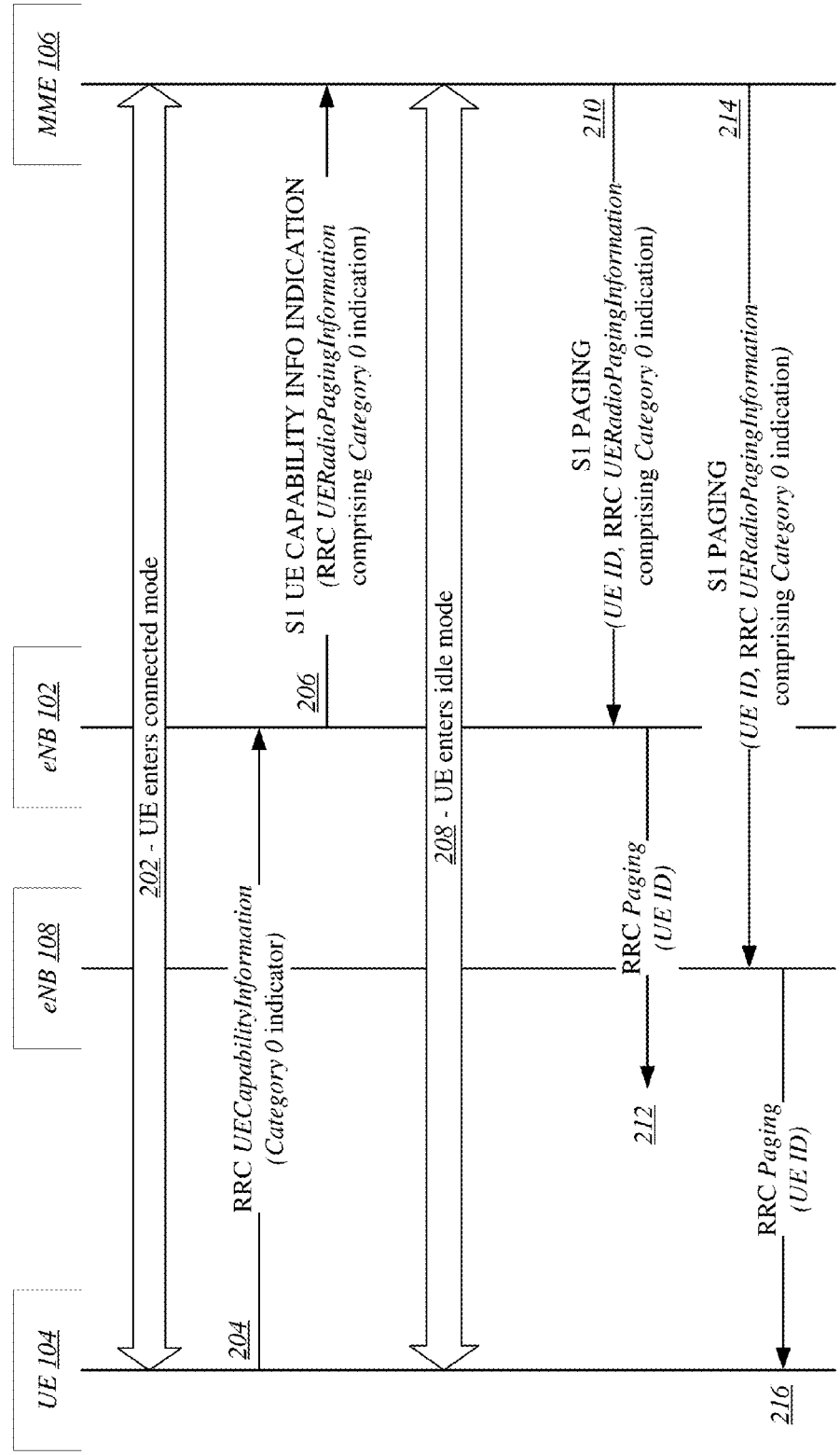
FIG. 2 illustrates an embodiment of a first communications flow.

FIG. 2 illustrates an example of a communications flow 200 that may be representative of a series of communications that may be exchanged among eNB 102, UE 104, MME 106, and eNB 108 of FIG. 1 in various embodiments in which UE 104 is an LCT UE. More particularly, communications flow 200 may be representative of a series of communications that may be exchanged in various embodiments in which UE 104 operates as a Cat-0 UE and this fact is made known to eNBs 102 and 108 in conjunction with paging operations.

As shown in FIG. 2, UE 104 may enter a connected mode at 202. In various embodiments, entering the connected mode may involve entering an RRC_CONNECTED state. At 204, UE 104 may transmit a radio resource control (RRC) UECapabilityInformation message to eNB 102. In some embodiments, UE 104 may include a Category 0 indicator in the RRC UECapabilityInformation message in order to notify eNB 102 that UE 104 is operating as a Cat-0 UE. In various embodiments, UE 104 may include the Category 0 indicator within a UE-RadioPagingInfo information element (IE) of the RRC UECapabilityInformation message. At 206, eNB 102 may send an S1 UE CAPABILITY INFO INDICATION message to MME 106. In various embodiments, eNB 102 may include an RRC UERadioPagingInformation message in the S1 UE CAPABILITY INFO INDICATION message, and the RRC UERadioPagingInformation message may comprise an indication that UE 104 is operating as a Cat-0 UE. In various embodiments, the RRC UERadioPagingInformation message may comprise an inter-node RRC message. In some embodiments, the indication that UE 104 is operating as a Cat-0 UE may be comprised in a UE-RadioPagingInfo IE of the RRC UERadioPagingInformation message. In various embodiments, the RRC UERadioPagingInformation message may be comprised within a UE Radio Capability for Paging IE of the S1 UE CAPABILITY INFO INDICATION message. In various embodiments, MME 106 may store the information in the RRC UERadioPagingInformation message within the UE context for UE 104.

At 208, UE 104 may enter an idle mode. In various embodiments, entering the idle mode may involve transitioning from an RRC_CONNECTED state to an RRC_IDLE state. At 210 and 214, respectively, MME 106 may send S1 PAGING messages to eNBs 102 and 108 in order to instruct them to page UE 104. In some embodiments, MME 106 may include a UE identifier (ID) for UE 104 within the S1 PAGING messages. In various embodiments, the UE ID for UE 104 may be contained within UE Paging Identity IEs of the S1 PAGING messages. In various embodiments, MME 106 may include RRC UERadioPagingInformation messages in the S1 PAGING messages, and the RRC UERadioPagingInformation messages may comprise indications that UE 104 is operating as a Cat-0 UE. In various embodiments, the indications that UE 104 is operating as a Cat-0 UE may be comprised in UE-RadioPagingInfo IEs of the RRC UERadioPagingInformation messages. In some embodiments, the RRC UERadioPagingInformation messages may be comprised within UE Radio Capability for Paging IEs of the S1 PAGING messages.

At 212 and 216, respectively, eNBs 102 and 108 may transmit RRC Paging messages in order to page UE 104. In various embodiments, the RRC Paging messages may comprise the UE ID for UE 104. In various embodiments, the UE ID for UE 104 may be comprised within PagingUE-Identity IEs of the RRC Paging messages. In various embodiments, having been notified—via the S1 PAGING messages that they received from MME 106 at 210 and 214, respectively—that UE 104 is operating as a Cat-0 UE, eNBs 102 and 108 may take this fact into account in conjunction with transmission of the RRC Paging messages that they transmit at 212 and 216, respectively. For example, in some embodiments, one or both of eNBs 102 and 108 may use a more reliable MCS and/or higher transmission power when transmitting its RRC Paging message to UE 104. The embodiments are not limited to these examples.

Returning to FIG. 1, in operating environment 100, UE 104 is located at a position near the cell edge of cell 103. In various embodiments, at this position, UE 104 may be unable to reliably receive transmissions from eNB 102 according to standard procedures. In various embodiments, factors contributing to UE 104's inability to reliably receive transmissions at this position may include its remoteness from eNB 102, attenuation caused by buildings and other structures located between the two devices, and/or other environmental factors. In various embodiments in which UE 104 is an LCT UE possessing limited reception capabilities, its reception capability limitations may also contribute to its inability to reliably receive transmissions from eNB 102 at this position according to standard procedures. The embodiments are not limited in this context.

In some embodiments, in order to enable the provision of reliable service in circumstances such as these, eNB 102 may implement extended coverage (EC) procedures. In various embodiments, such EC procedures may generally involve the use of techniques designed to facilitate the provision of reliable coverage/service to UEs positioned in locations at which they are unable to reliably receive transmissions according to standard procedures. In various embodiments, the implementation of EC procedures may enable the provision of service to LCT UEs positioned in locations at which their reception capability limitations would otherwise render them unable to obtain reliable service. It is to be appreciated, however, that in various embodiments, the use of EC procedures may not be limited to communications with LCT UEs, and EC procedures may thus be implemented to the benefit of non-LCT UEs as well. The embodiments are not limited in this context.

Hereinafter, with respect to a given UE in a given cell, the term "EC region" is employed to collectively denote the positions within the cell at which the UE cannot be reliably served according to standard procedures. The term "normal coverage (NC) region" is employed hereinafter to collectively denote the positions that are not in the EC region, which comprise the positions at which the UE can be reliably served according to standard procedures. In the example of FIG. 1, if UE 104 cannot be provided with reliable service at its position within cell 103 using standard procedures, then that position is comprised in the EC region of cell 103 with respect to UE 104.

It is worthy of note that—with respect to any given cell such as cell 103 —the composition of the EC region may vary among UEs, such that a position that is located within the EC region with respect to one UE may be located in the NC region with respect to another UE. It is also worthy of note that whether a given point is located in the EC region with respect to a given UE may depend on multiple factors, which may or may not include the remoteness of that point from the eNB that serves the cell. For example, a point that is relatively close to the center of cell 103 may nevertheless be comprised in the EC region with respect to UE 104 if that point is located deep within the inner recesses of a building. The embodiments are not limited to this example.

In some embodiments, a given UE in a given cell may need to operate in an EC mode in order to make use of coverage enhancements that may be provided via EC procedures in that cell. The term "EC-capable UE" is employed hereinafter to denote a UE that is configured with the capability to operate in such an EC mode. In various embodiments, EC mode capabilities/operations may be configured independently from LCT mode capabilities/operations, such that a given EC-capable UE may or may not be an LCT UE, and a given LCT UE may or may not be EC-capable. In various other embodiments, EC mode capabilities/operations and LCT mode capabilities/operations may be configured jointly, such that any UE capable of operating in an LCT mode will also be capable of operating in an EC mode, and vice-versa. The embodiments are not limited in this context.

In various embodiments, an LCT UE that is EC-capable may use a same message to notify other RAN devices both of the fact that it is an LCT UE and of the fact that it is EC-capable. For example, in some embodiments in which UE 104 operates as a Cat-0 UE and is EC-capable, it may include both a Category 0 indicator and an EC capability indicator within a message that it sends to eNB 102, such as the RRC UECapabilityInformation message that it sends at 204 in communications flow 200 of FIG. 2. In various embodiments, a given eNB may be configured to consider whether a given UE is EC-capable in conjunction with performing a paging procedure to page that UE. For example, eNB 102 may be configured to determine whether UE 104 is EC-capable based on capability information it receives from UE 104, and may take the result of this determination into account in conjunction with performing a paging procedure to page UE 104.

Figure 3:
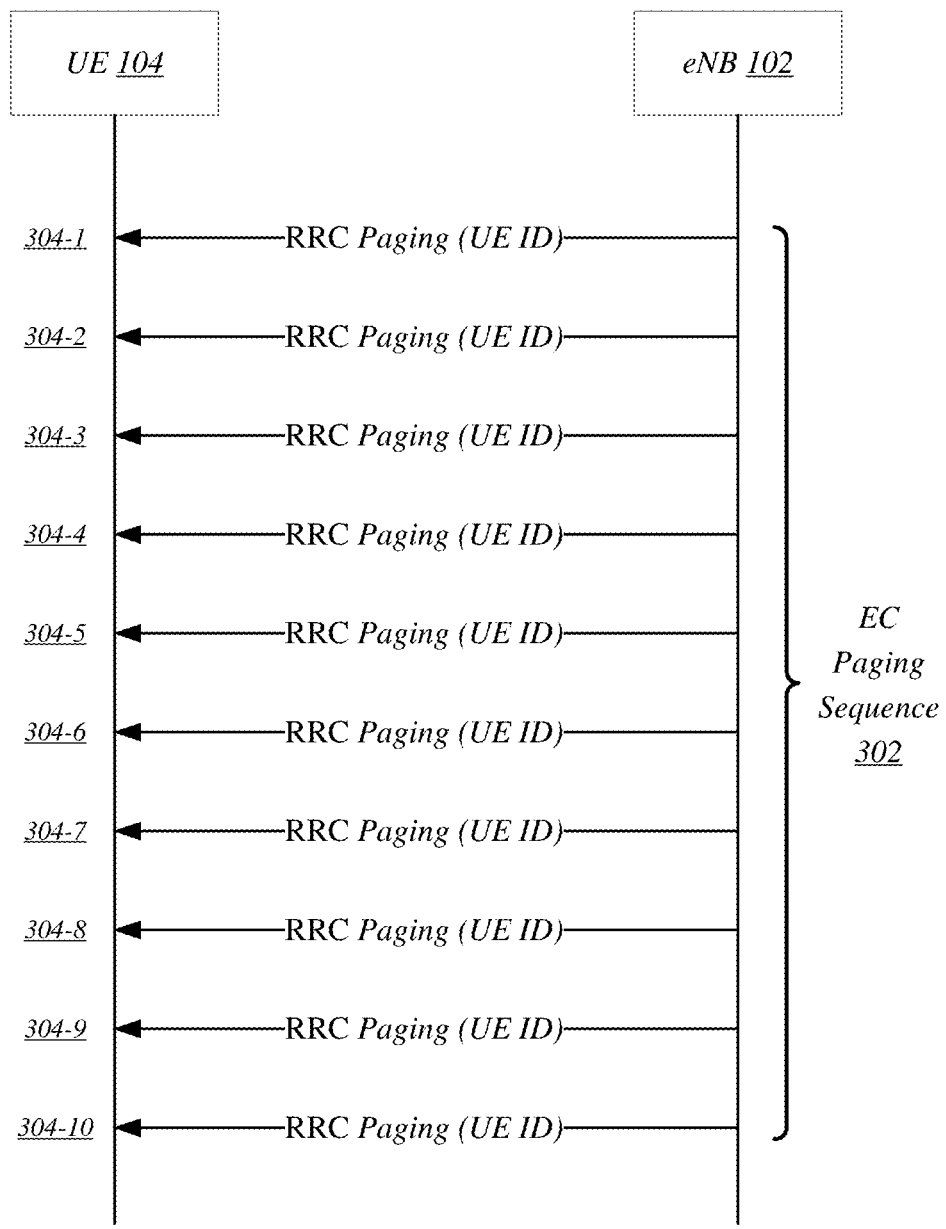
FIG. 3 illustrates an embodiment of a second communications flow.

In various embodiments, eNB 102 may be configured with the capability to use an EC paging procedure to page EC-capable UEs. In various embodiments, according to the EC paging procedure, eNB 102 may repeatedly transmit paging messages to an EC-capable UE over the course of an EC paging sequence. FIG. 3 illustrates an example of a communications flow 300 that may be representative of such an EC paging procedure according to some embodiments. In communications flow 300, eNB 102 repeatedly transmits RRC Paging messages to UE 104 —which is assumed to be have been determined as being EC-capable for the purposes of this example—over the course of an EC paging sequence 302, which comprises a total of ten paging message transmissions 304-1 to 304-10. It is to be appreciated that in various embodiments, a given EC paging sequence may comprise a greater or lesser number of paging transmissions than the ten comprised in EC paging sequence 302, and the embodiments are not limited to this example.

Returning to FIG. 1, in various embodiments, eNB 102 may be configurable to use an EC paging procedure to page any UE that it determines to be EC-capable. In various embodiments, use of the EC paging procedure may enable successful paging of an EC-capable UE when it is located in the EC region and unable to be successfully paged via standard paging procedures. However, if the EC-capable UE is located in the NC region, the use of EC paging procedures may result in the transmission of a significant number of unnecessary paging messages. For example, in reference to communications flow 300 of FIG. 3, if UE 104 successfully receives the initial RRC Paging message transmission at 304-1, then the nine additional RRC Paging messages transmitted at 304-2 to 304-10 may be unnecessary. Thus, configuring eNB 102 to always use the EC paging procedure when paging EC-capable UEs—to assume, in effect, that EC-capable UEs are always located in the EC region—may result in significant waste of radio resources.

Disclosed herein are adaptive paging techniques for EC-capable devices, which may enable reduction of radio resource waste associated with the paging of EC-capable UEs. According to some such techniques, an eNB such as eNB 102 may terminate an EC paging sequence following a determination that a response has been received from an EC-capable UE being paged. In various embodiments, before initiating an EC paging sequence to page an EC-capable UE, an eNB may perform a short paging sequence comprising transmission of a small number of paging messages. In various such embodiments, the eNB may forgo performance of an EC paging sequence following a determination that the EC-capable UE has responded to a paging message transmitted during the short paging sequence. In various embodiments, use of the EC paging sequence may be limited to a subset of the cells comprised in a tracking area in which the EC-capable UE is registered. In some such embodiments, this subset may comprise one or more cells in which the EC-capable UE was last known to be located and operating in the EC mode. The embodiments are not limited in this context.

Figure 4:
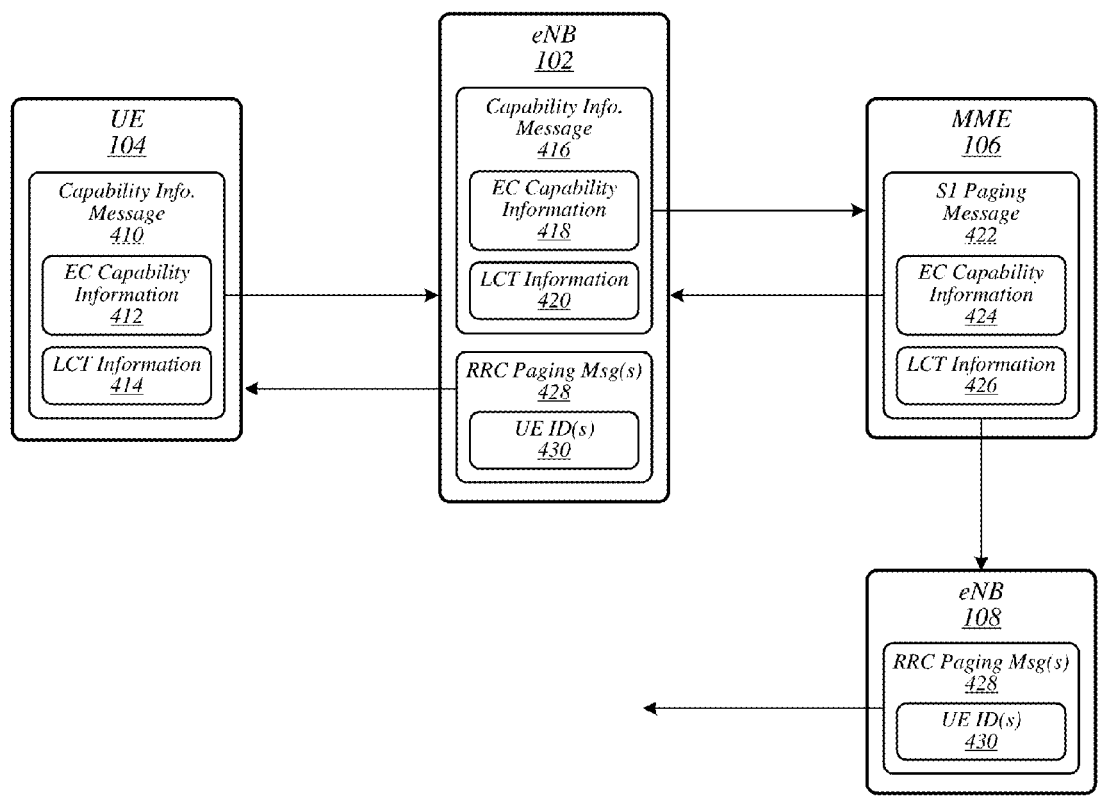
FIG. 4 illustrates an embodiment of a second operating environment.

FIG. 4 illustrates an example of an operating environment 400 that may be representative of various embodiments. In operating environment 400, UE 104 may send a capability information message 410 to eNB 102. In various embodiments, UE 104 may send capability information message 410 to eNB 102 while UE 104 is operating in an RRC_CONNECTED state. In various embodiments, capability information message 410 may generally comprise a message that UE 104 uses to provide information regarding its radio access capabilities. In some embodiments, capability information message 410 may comprise an RRC message, such as an RRC UECapabilityInformation message. The embodiments are not limited in this context.

In various embodiments, UE 104 may include EC capability information 412 within capability information message 410. In various embodiments, EC capability information 412 may generally comprise information indicating whether UE 104 is an EC-capable UE. In various embodiments, in order to provide notification that it is EC-capable, UE 104 may include—within capability information message 410—EC capability information 412 that comprises an EC capability indicator. In some embodiments in which capability information message 410 comprises an RRC UECapabilityInformation message, UE 104 may include EC capability information 412 within a UE-RadioPagingInfo IE of that RRC UECapabilityInformation message. In various other embodiments in which capability information message 410 comprises an RRC UECapabilityInformation message, UE 104 may include EC capability information 412 within a different IE of that RRC UECapabilityInformation message, such as a newly-defined IE designated for use to convey EC capability information 412. The embodiments are not limited in this context.

In various embodiments, UE 104 may also include LCT information 414 within capability information message 410. In various embodiments, LCT information 414 may generally comprise information indicating whether UE 104 is operating in an LCT mode. For example, in some embodiments, LCT information 414 may indicate whether UE 104 is operating as a Cat-0 or Cat-M UE. In various embodiments in which capability information message 410 comprises an RRC UECapabilityInformation message, UE 104 may include LCT information 414 within a UE-RadioPagingInfo IE of that RRC UECapabilityInformation message. For example, in various embodiments in which capability information message 410 comprises an RRC UECapabilityInformation message and UE 104 operates as a Cat-0 or Cat-M UE, LCT information 414 may comprise a Category 0 or Category M indicator that UE 104 includes within a UE-RadioPagingInfo IE of that RRC UECapabilityInformation message. In various other embodiments in which capability information message 410 comprises an RRC UECapabilityInformation message, UE 104 may include some or all of LCT information 414 within a different IE of that RRC UECapabilityInformation message. For example, in some embodiments in which capability information message 410 comprises an RRC UECapabilityInformation message and UE 104 operates as a Cat-M UE, LCT information 414 may comprise a Category M indicator that UE 104 includes within a newly-defined IE designated for use to convey a Category M indicator. The embodiments are not limited in this context.

In various embodiments, in order to pass some or all of EC capability information 412 and LCT information 414 to MME 106, eNB 102 may send a capability information message 416 to MME 106. In various embodiments, capability information message 416 may generally comprise a message that eNB 102 uses to provide MME 106 with information that eNB 102 has obtained regarding radio access capabilities of UE 104. In various embodiments, capability information message 416 may comprise an S1 message, such as an S1 UE CAPABILITY INFO INDICATION message. The embodiments are not limited in this context.

In some embodiments, eNB 102 may include EC capability information 418 within capability information message 416. In various embodiments, EC capability information 418 may generally comprise information indicating whether UE 104 is an EC-capable UE. In various embodiments, eNB 102 may compose EC capability information 418 based on EC capability information 412 that it receives from UE 104. In various embodiments, in order to provide notification that UE 104 is EC-capable, eNB 102 may include—within capability information message 416—EC capability information 418 that comprises an EC capability indicator. In some embodiments in which capability information message 416 comprises an S1 UE CAPABILITY INFO INDICATION message, eNB 102 may include EC capability information 418 within an IE of an inter-node RRC UERadioPagingInformation message contained in a UE Radio Capability for Paging IE of that S1 UE CAPABILITY INFO INDICATION message. In various such embodiments, eNB 102 may include EC capability information 418 within a UE-RadioPagingInfo IE of the inter-node RRC UERadioPagingInformation message. In various other such embodiments, eNB 102 may include EC capability information 418 within a different IE of the inter-node RRC UERadioPagingInformation message, such as a newly-defined IE designated for use to convey EC capability information 418. The embodiments are not limited in this context.

In various embodiments, eNB 102 may also include LCT information 420 within capability information message 416. In some embodiments, LCT information 420 may generally comprise information indicating whether UE 104 is operating in an LCT mode. In various embodiments, eNB 102 may compose LCT information 420 based on LCT information 414 that it receives from UE 104. In various embodiments, LCT information 420 may indicate whether UE 104 is operating as a Cat-0 or Cat-M UE. In various embodiments in which capability information message 416 comprises an S1 UE CAPABILITY INFO INDICATION message, eNB 102 may include LCT information 420 within one or more IEs of an inter-node RRC UERadioPagingInformation message contained in a UE Radio Capability for Paging IE of that S1 UE CAPABILITY INFO INDICATION message. In some such embodiments, eNB 102 may include LCT information 420 within a UE-RadioPagingInfo IE of the inter-node RRC UERadioPagingInformation message. For example, in various embodiments in which capability information message 416 comprises an S1 UE CAPABILITY INFO INDICATION message and UE 104 operates as a Cat-0 or Cat-M UE, LCT information 420 may comprise a Category 0 or Category M indicator that eNB 102 includes within a UE-RadioPagingInfo IE of an inter-node RRC UERadioPagingInformation message contained in a UE Radio Capability for Paging IE of that S1 UE CAPABILITY INFO INDICATION message.

In various other embodiments in which capability information message 416 comprises an S1 UE CAPABILITY INFO INDICATION message and eNB 102 includes LCT information 420 within one or more IEs of an inter-node RRC UERadioPagingInformation message contained in a UE Radio Capability for Paging IE of that S1 UE CAPABILITY INFO INDICATION message, eNB 102 may include some or all of LCT information 420 within an IE other than a RadioPagingInfo IE of the inter-node RRC UERadioPagingInformation message. For example, in various embodiments in which capability information message 416 comprises an S1 UE CAPABILITY INFO INDICATION message and UE 104 operates as a Cat-M UE, LCT information 420 may comprise a Category M indicator that eNB 102 includes within a newly-defined IE designated for use to convey a Category M indicator within an inter-node RRC UERadioPagingInformation message. The embodiments are not limited in this context.

In some embodiments, following receipt of capability information message 416 from eNB 102, MME 106 may store information comprised in capability information message 416 within a UE context for UE 104. In various embodiments, for example, MME 106 may store EC capability information 418 and LCT information 420 within the UE context for UE 104. In various embodiments, at some point in time following its transmission of capability information message 410, UE 104 may enter an idle mode, such as an RRC_IDLE state. In various embodiments, while UE 104 is operating in the idle mode, MME 106 may determine that UE 104 is to be paged. In some embodiments, based on such a determination, MME 106 may initiate one or more S1 paging procedures in order to instruct one or more respective eNBs to page UE 104. In various embodiments, MME 106 may initiate a respective S1 paging procedure for each eNB in a current tracking area of UE 104. For example, in reference to operating environment 100 of FIG. 1, if the current tracking area of UE 104 comprises eNBs 102 and 108, then MME 106 may initiate respective S1 paging procedures in order to instruct eNBs 102 and 108 to page UE 104. The embodiments are not limited to this example.

In various embodiments, in order to initiate an S1 paging procedure to instruct eNB 102 to page UE 104, MME 106 may send an S1 paging message 422 to eNB 102. In various embodiments, S1 paging message 422 may comprise an S1 PAGING message. In some embodiments, MME 106 may include EC capability information 424 within S1 paging message 422. In various embodiments, EC capability information 424 may generally comprise information indicating whether UE 104 is an EC-capable UE. In various embodiments, MME 106 may compose EC capability information 424 based on EC capability information 418 that it previously stored in the UE context for UE 104. In various embodiments, in order to provide eNB 102 with notification that UE 104 is EC-capable, MME 106 may include—within S1 paging message 422 —EC capability information 424 that comprise an EC capability indicator. In some embodiments in which S1 paging message 422 comprises an S1 PAGING message, MME 106 may include EC capability information 424 within an IE of an inter-node RRC UERadioPagingInformation message contained in a UE Radio Capability for Paging IE of that S1 PAGING message. In various such embodiments, MME 106 may include EC capability information 424 within a UE-RadioPagingInfo IE of the inter-node RRC UERadioPagingInformation message. In various other such embodiments, MME 106 may include EC capability information 424 within a different IE of the inter-node RRC UERadioPagingInformation message, such as a newly-defined IE designated for use to convey EC capability information 424. The embodiments are not limited in this context.

In various embodiments, MME 106 may also include LCT information 426 within S1 paging message 422. In some embodiments, LCT information 426 may generally comprise information indicating whether UE 104 is operating in an LCT mode. In various embodiments, MME 106 may compose LCT information 426 based on LCT information 420 that it previously stored in the UE context for UE 104. In various embodiments, LCT information 426 may indicate whether UE 104 is operating as a Cat-0 or Cat-M UE. In various embodiments in which S1 paging message 422 comprises an S1 PAGING message, MME 106 may include LCT information 426 within one or more IEs of an inter-node RRC UERadioPagingInformation message contained in a UE Radio Capability for Paging IE of that S1 PAGING message. In some such embodiments, MME 106 may include LCT information 426 within a UE-RadioPagingInfo IE of the inter-node RRC UERadioPagingInformation message. For example, in various embodiments in which S1 paging message 422 comprises an S1 PAGING message and UE 104 operates as a Cat-0 or Cat-M UE, LCT information 426 may comprise a Category 0 or Category M indicator that MME 106 includes within a UE-RadioPagingInfo IE of an inter-node RRC UERadioPagingInformation message contained in a UE Radio Capability for Paging IE of that S1 PAGING message.

In various other embodiments in which S1 paging message 422 comprises an S1 PAGING message and MME 106 includes LCT information 426 within one or more IEs of an inter-node RRC UERadioPagingInformation message contained in a UE Radio Capability for Paging IE of that S1 PAGING message, MME 106 may include some or all of LCT information 426 within an IE other than a RadioPagingInfo IE of the inter-node RRC UERadioPagingInformation message. For example, in various embodiments in which S1 paging message 422 comprises an S1 PAGING message and UE 104 operates as a Cat-M UE, LCT information 426 may comprise a Category M indicator that MME 106 includes within a newly-defined IE designated for use to convey a Category M indicator within an inter-node RRC UERadioPagingInformation message. The embodiments are not limited in this context.

In some embodiments, following receipt of S1 paging message 422, eNB 102 may initiate an RRC paging procedure, according to which it may page UE 104. According to the RRC paging procedure in various embodiments, eNB 102 may page one or more other UEs in addition to UE 104. According to the RRC paging procedure in various other embodiments, eNB 102 may page only UE 104. In various embodiments, the RRC paging procedure may involve the transmission of one or more RRC paging messages 428. In some embodiments, MME 106 may send on or more additional S1 paging messages 422 to one or more respective additional eNBs within the tracking area of eNB 102. In various embodiments, the one or more additional eNBs may also initiate the RRC paging procedure. For example, in various embodiments, MME 106 may transmit S1 paging messages 422 to both eNB 102 and eNB 108, which may both initiate the RRC paging procedure and transmit one or more RRC paging messages 428. The embodiments are not limited to this example.

In various embodiments, each RRC paging message 428 may comprise an RRC Paging message. In some embodiments, each RRC paging message 428 may include a respective UE ID 430 for each UE being paged. In various embodiments in which each RRC paging message 428 is an RRC Paging message, each UE ID 430 comprised in any given RRC paging message 428 may be contained in a PagingUE-Identity IE of a respective PagingRecord IE in that RRC paging message 428. In various embodiments in which eNB 102 pages only UE 104, each RRC paging message 428 may be an RRC Paging message containing a single PagingRecord IE, in turn containing a PagingUE-Identity IE comprising a UE ID 430 associated with UE 104. In various embodiments in which eNB 102 pages a set of multiple UEs that includes UE 104, each RRC paging message 428 may be an RRC Paging message containing a set of multiple PagingRecord IEs, each in turn containing a PagingUE-Identity IE comprising a UE ID 430 associated with a respective one of the multiple UEs. The embodiments are not limited in this context.

In some embodiments, following a determination that UE 104 is to be paged, MME 106 may access the UE context for UE 104 and determine that UE 104 is an EC-capable UE. In various embodiments, based on a determination that UE 104 is EC-capable, MME 106 may include EC capability information 424 indicating this fact in S1 paging messages 422 that it sends to eNBs 102 and 108. In various such embodiments, in conjunction with determinations—based on received S1 paging messages 422—that UE 104 is to be paged, eNBs 102 and 108 may determine that UE 104 is EC-capable based on the indications that MME 106 included within EC capability information 424. In various embodiments, one or more of MME 106, eNB 102, and eNB 108 may implement one or more adaptive paging techniques in response to determining that UE 104 is EC-capable. The embodiments are not limited in this context.

Figure 5:
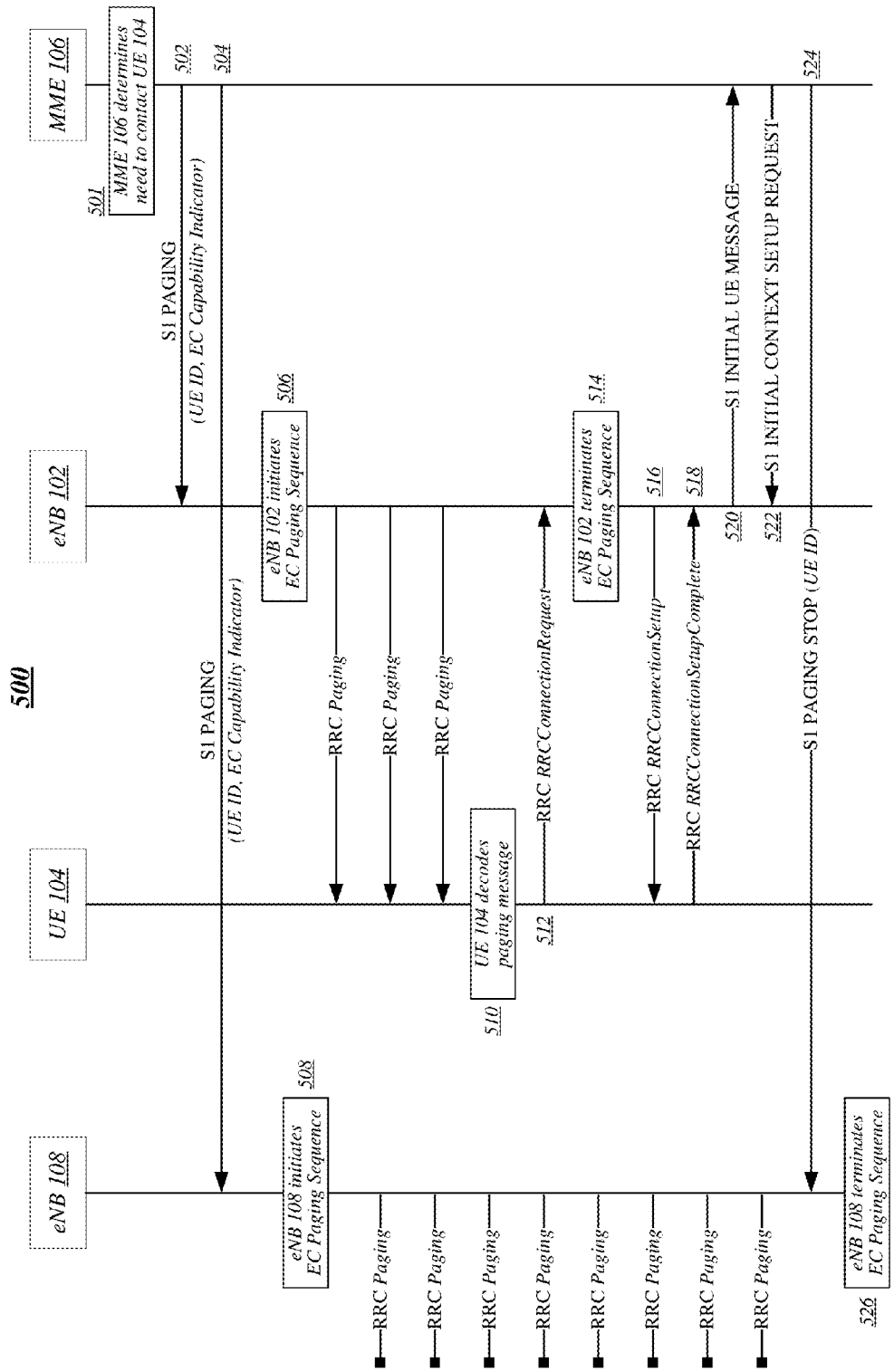
FIG. 5 illustrates an embodiment of a third communications flow.

FIG. 5 illustrates an example of a communications flow 500 that may be representative of the implementation of one or more adaptive paging techniques for EC-capable devices according to some embodiments. More particularly, communications flow 500 may be representative of various embodiments in which a given eNB may be configured to terminate an EC paging sequence based on a determination that a response has been received from an EC-capable UE being paged. Communications flow 500 reflects an assumed example scenario in which UE 104 is camped in idle mode on a cell controlled by eNB 102, and is registered on a TA (or set of TAs) that includes the cell controlled by eNB 102 and a cell controlled by eNB 108. The embodiments are not limited to this example scenario.

As shown in FIG. 5, communications flow 500 may begin at 501, where MME 106 may determine that it needs to contact UE 104. For example, MME 106 may determine that it needs to contact UE 104 due to the arrival in the core network of DL data intended for UE 104. At 502 and 504, MME 106 may send S1 PAGING messages to eNB 102 and eNB 108, respectively, and each of these S1 PAGING messages may comprise a UE ID of UE 104 and an EC capability indicator indicating that UE 104 is EC-capable. In response to the S1 PAGING messages they receive at 502 and 504, eNB 102 and eNB 108 may initiate EC paging sequences at 506 and 508, respectively, and these EC paging sequences may involve repeated transmissions of RRC Paging messages.

At 510, UE 104 may successfully decode an RRC Paging message transmitted by eNB 102. If UE 104 is located in the NC region of the cell served by eNB 102, it may successfully decode the RRC Paging message based solely on the first RRC Paging transmission that eNB 102 performs after initiating the EC paging sequence at 506. If UE 104 is located in the EC region of the cell served by eNB 102, it may need to receive and combine several of the RRC Paging transmissions from eNB 102 before it can successfully decode the RRC Paging message. The numbers of RRC Paging transmissions that UE 104 may need to combine in order to successfully decode the RRC Paging message may vary from embodiment to embodiment, based on the path-loss between UE 104 and eNB 102, for example.

In response to successfully decoding the RRC Paging message sent by eNB 102, UE 104 may initiate an RRC connection establishment procedure in order to establish an RRC connection with eNB 102. In accordance with the RRC connection establishment procedure, UE 104 may transmit an RRC RRCConnectionRequest message to eNB 102 at 512. In various embodiments, in response to receipt of the RRC RRCConnectionRequest message, eNB 102 may terminate at 514 the EC paging sequence that it initiated at 506. In various embodiments, eNB 102 may determine to terminate the EC paging sequence based on a determination that a UE ID—such as an S-TMSI identity—comprised in the RRC RRCConnectionRequest message matches the UE ID for UE 104. At 516, eNB 102 may transmit an RRC RRCConnectionSetup message to UE 104. UE 104 may reply with an RRC RRCConnectionSetupComplete message at 518, at which point the establishment of the RRC connection between UE 104 and eNB 102 may be complete. In some embodiments, rather than terminating the EC paging sequence at 514 in response to receipt of the RRC RRCConnectionRequest message at 512, eNB 102 may terminate the EC paging sequence in response to receipt of the RRC RRCConnectionSetupComplete message at 518.

Following establishment of its RRC connection with UE 104, eNB 102 may initiate an S1 connection establishment procedure in order to establish an S1 connection towards MME 106. In accordance with the S1 connection establishment procedure, eNB 102 may send an S1 INITIAL UE MESSAGE message to MME 106. In various embodiments, the S1 INITIAL UE MESSAGE message may contain a Service Request message or Tracking Area Update message sent by UE 104. At 522, MME 106 may send an S1 INITIAL CONTEXT SETUP REQUEST message to eNB 102 in response to the S1 INITIAL UE MESSAGE message received at 520. In various embodiments, rather than terminating the EC paging sequence at 514 in response to receipt of the RRC RRCConnectionRequest message at 512 or terminating the EC paging sequence in response to receipt of the RRC RRCConnectionSetupComplete message at 518, eNB 102 may terminate the EC paging sequence in response to receipt of the S1 INITIAL CONTEXT SETUP REQUEST message at 522. In various embodiments, eNB 102 may determine to terminate the EC paging sequence based on a determination that a UE ID—such as an S-TMSI identity—comprised in the S1 INITIAL CONTEXT SETUP REQUEST message matches the UE ID for UE 104.

eNB 108 may not be privy to the communications exchanged among eNB 102, UE 104, and MME 106, and thus may have no way of directly detecting that UE 104 has responded to paging. As such, eNB 108 may continue performing the EC paging sequence that it initiated at 508 even after UE 104 has established an RRC connection with eNB 102 and eNB 102 has terminated the EC paging sequence that it initiated at 506. Thus, at 524, MME 106 may send a newly-defined S1 PAGING STOP message to eNB 108 in order to notify eNB 108 that UE 104 no longer needs to be paged. At 526, based on receipt of the S1 PAGING STOP message, eNB 108 may terminate the EC paging sequence that it initiated at 508. In some embodiments, a modified format may be defined for S1 PAGING messages, according to which they can be used to indicate that paging should be stopped. In various such embodiments, rather than using a newly-defined message to notify eNB 108 that UE 104 no longer needs to be paged, MME 106 may use such a modified-format S1 PAGING message. The embodiments are not limited in this context.

In various embodiments, MME 106 may send the S1 PAGING STOP message at 526 in response to receipt of the S1 INITIAL UE MESSAGE from eNB 102 at 520. In various other embodiments, eNB 102 may use a newly-defined message to notify MME 106 that UE 104 has responded to paging, and MME 106 may send the S1 PAGING STOP message to eNB 108 in response to receipt of that newly-defined message. For example, based on receipt of the RRC RRCConnectionRequest message from UE 104 at 512, eNB 102 may not only terminate the EC paging sequence at 514 but also send a newly-defined UE Paging Response Notification message to MME 106 in order to notify MME 106 that UE 104 has responded to paging. MME 106 may then send an S1 PAGING STOP message to eNB 108 in response to receipt of the UE Paging Response Notification message, rather than waiting for receipt of the S1 INITIAL UE MESSAGE at 520. The embodiments are not limited to this example.

It is worthy of note that in some embodiments, the EC paging sequences that eNBs 102 and 108 initiate at 506 and 508, respectively, may involve paging one or more other UEs in addition to UE 104. In various embodiments, each RRC Paging message that eNBs 102 and 108 transmit may contain a respective UE ID for each of multiple UEs being paged. In various embodiments, the capability of each paged UE to successfully combine multiple RRC Paging transmissions and decode the RRC Paging message may hinge on the content of these transmissions remaining constant. Thus, in various embodiments, eNBs 102 and 108 may not be able to terminate their respective EC paging sequences at 514 and 526, and instead may need to continue sending RRC Paging messages, of which UE 104 may continue to be specified—via the inclusion of its UE ID within those messages—as an intended recipient. The embodiments are not limited in this context.

In some embodiments, eNBs 102 and 108 may not be able to terminate their EC paging sequences until responses have been received from each of a set of multiple UEs being paged. In various embodiments, in order to improve the likelihood that they will be able to terminate EC paging sequences after small numbers of RRC Paging transmissions, eNBs 102 and/or 108 may group UEs that are likely to require similar numbers of paging repetitions. In various embodiments, eNBs 102 and/or 108 may estimate these required numbers of paging repetitions based on respective signal strength and/or quality measurements obtained while the various grouped UEs last operated in connected mode. In various embodiments, by populating a given paging group with UEs that are likely to require relatively few paging repetitions, an eNB such as eNB 102 and/or eNB 108 may be able to increase the chances that an EC paging sequence directed to that paging group can be terminated relatively quickly. In some embodiments, in order to provide additional flexibility with respect to paging transmissions, a new paging Radio Network Temporary Identifier (P-RNTI) may be defined, in order to enable eNBs to send multiple paging messages for different levels of repetition. In various embodiments, the new P-RNTI may be used only for EC-capable UEs. The embodiments are not limited in this context.

Figure 6:
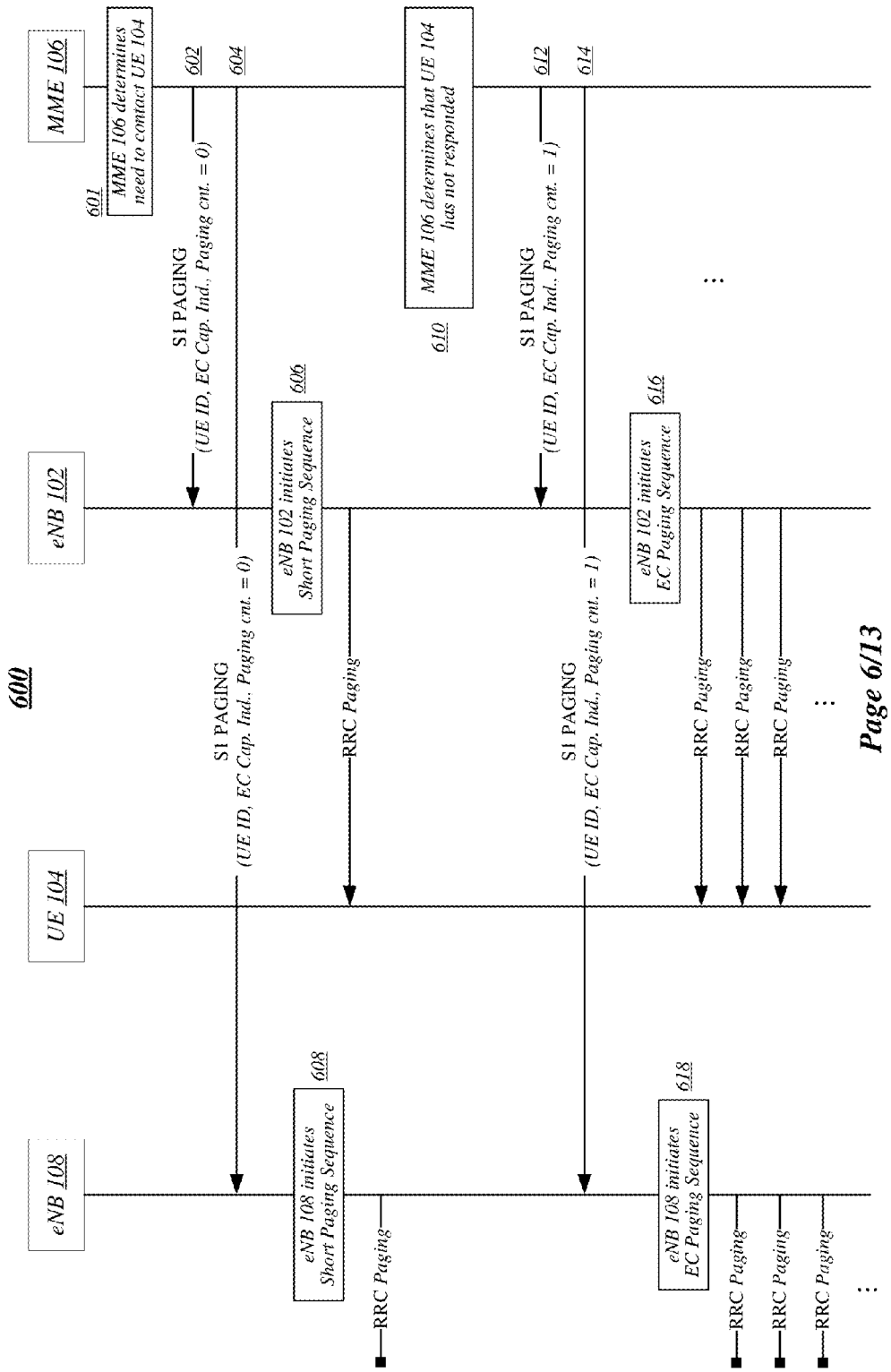
FIG. 6 illustrates an embodiment of a fourth communications flow.

FIG. 6 illustrates an example of a communications flow 600 that may be representative of the implementation of one or more adaptive paging techniques for EC-capable devices according to various embodiments. More particularly, communications flow 600 may be representative of various embodiments in which a given eNB may be configured to attempt to reach a given EC-capable UE using a short paging sequence before paging that UE using an EC paging sequence. Like communications flow 500 of FIG. 5, communications flow 600 reflects an assumed example scenario in which UE 104 is camped in idle mode on a cell controlled by eNB 102, and is registered on a TA (or set of TAs) that includes the cell controlled by eNB 102 and a cell controlled by eNB 108. The embodiments are not limited to this example scenario.

As shown in FIG. 6, communications flow 600 may begin at 601, where MME 106 may determine that it needs to contact UE 104. For example, MME 106 may determine that it needs to contact UE 104 due to the arrival in the core network of DL data intended for UE 104. At 602 and 604, MME 106 may send S1 PAGING messages to eNB 102 and eNB 108, respectively, and each of these S1 PAGING messages may comprise a UE ID of UE 104 and an EC capability indicator indicating that UE 104 is EC-capable. Each of these S1 PAGING messages may also comprise a paging strategy parameter for use by the receiving eNBs in conjunction with determining how to conduct paging of UE 104. In some embodiments, the paging strategy parameter may comprise information generally describing attempts that have already been made to page UE 104. For example, in various embodiments, the paging strategy parameter may comprise a paging count value indicating a number of previous attempts that have been made to page UE 104. In another example, in various embodiments, the paging strategy parameter may comprise a bit flag/indicator set to indicate either that no previous attempts have been made or that at least one previous attempt has been made. In various embodiments, the paging strategy parameter may comprise information generally describing the extent, if any, to which paging repetitions should be performed in conjunction with paging UE 104. For example, in some embodiments, the paging strategy parameter may comprise a bit/flag indicator set to indicate either that paging repetitions should be used or that only a single paging message transmission should be performed. In another example, in various embodiments, the paging strategy parameter may comprise a repetition count value indicating a number of paging repetitions that should be performed in paging UE 104. The embodiments are not limited to these examples.

In the example depicted in FIG. 6, MME 106 includes a paging count value in each of the S1 PAGING messages that it transmits to eNBs 102 and 108. In the S1 PAGING messages transmitted at 602 and 604, MME 106 includes paging count values of 0, indicating that those S1 PAGING messages correspond to a first attempt to page UE 104. Following receipt of these S1 PAGING messages, eNB 102 and eNB 108 may determine how to proceed based on the paging count values comprised in the S1 PAGING messages. Based on determinations that the paging count values are equal to 0—and thus that the S1 PAGING messages correspond to a first attempt to page UE 104 —eNBs 102 and 108 may initiate short paging sequences at 606 and 608, respectively. These short paging sequences may generally involve the transmission of lesser numbers of paging messages than are transmitted during EC paging sequences such as those initiated at 506 and 508 in communications flow 500 of FIG. 5. In various embodiments, the short paging sequences may involve transmitting only a single paging message. In various such embodiments, the short paging sequences may involve the same operations/procedures as those associated with paging non-EC-capable UEs and/or EC-capable UEs located in NC regions of their cells. In some embodiments, the short paging sequences may involve multiple paging message transmissions, but a small number of such transmissions, such as two or three transmissions. In various embodiments, eNBs 102 and 108 may select the numbers of paging message transmissions that are performed during the short paging sequences. In various other embodiments, these numbers may be specified within the S1 PAGING messages received from MME 106, or may be statically or semi-statically defined. The embodiments are not limited in this context.

In the example of communications flow 600, the short paging sequences that eNBs 102 and 108 initiate at 606 and 608, respectively, involve single paging message transmissions. At 610, MME 106 may determine that the short paging sequences have not been successful in reaching UE 104. In various embodiments, MME 106 may arrive at this conclusion if it has not received notification of a UE response upon expiration of timer T3413 which is started by MME when a paging procedure is initiated. In response to the determination that the short paging sequences have been unsuccessful, MME 106 may send second S1 PAGING messages to eNBs 102 and 108 at 612 and 614, respectively. MME 106 may include a paging count value equal to 1 in these S1 PAGING messages, indicating that one attempt to reach UE 104 has already been performed. Following receipt of these S1 PAGING messages, eNBs 102 and 108 may once again determine how to proceed based on the paging count values comprised in the S1 PAGING messages. At 616 and 618, based on determinations that the paging count values are equal to 1—and thus that the S1 PAGING messages correspond to a second attempt to page UE 104 —eNBs 102 and 108 may initiate EC paging sequences, which may be the same as or similar to the EC paging sequences initiated at 506 and 508 in communications flow 500 of FIG. 5. In some embodiments, the approach reflected in communications flow 600 —generally, the inclusion of a paging strategy parameter such as a paging count value with the S1 PAGING messages for use by the receiving eNBs in conjunction with determining how to conduct paging of UE 104 —may be combined with the approach reflected in communication flow 500 of FIG. 5. In various such embodiments, one or both of the EC paging sequences initiated at 616 and 618 may subsequently be truncated based on receipt of a response from UE 104. In various other embodiments, the approach of FIG. 5 may not be combined with that of FIG. 6, and thus the EC paging sequences initiated at 616 and 618 may fully completed regardless of when/whether a response is received from UE 104. The embodiments are not limited in this context.

It is worthy of note that in various embodiments, in order to assist eNBs 102 and 108 with determining how to conduct paging of UE 104, MME 106 may include—in addition to or rather than the aforementioned paging strategy parameter—one or more other parameters within the S1 PAGING messages that it sends to eNBs 102 and 108. For example, in some embodiments, MME 106 may include an EC mode flag within these S1 PAGING messages, and the EC mode flag may indicate whether UE 104 is assumed to be located in the EC region of its cell. In another example, in various embodiments, MME 106 may include—within S1 PAGING messages that it sends to eNBs 102 and 108 —reference signal received power (RSRP) and/or reference signal received quality (RSRQ) measurements that UE 104 provided when it was operated in connected mode the last time. The embodiments are not limited to these examples.

Figure 7:
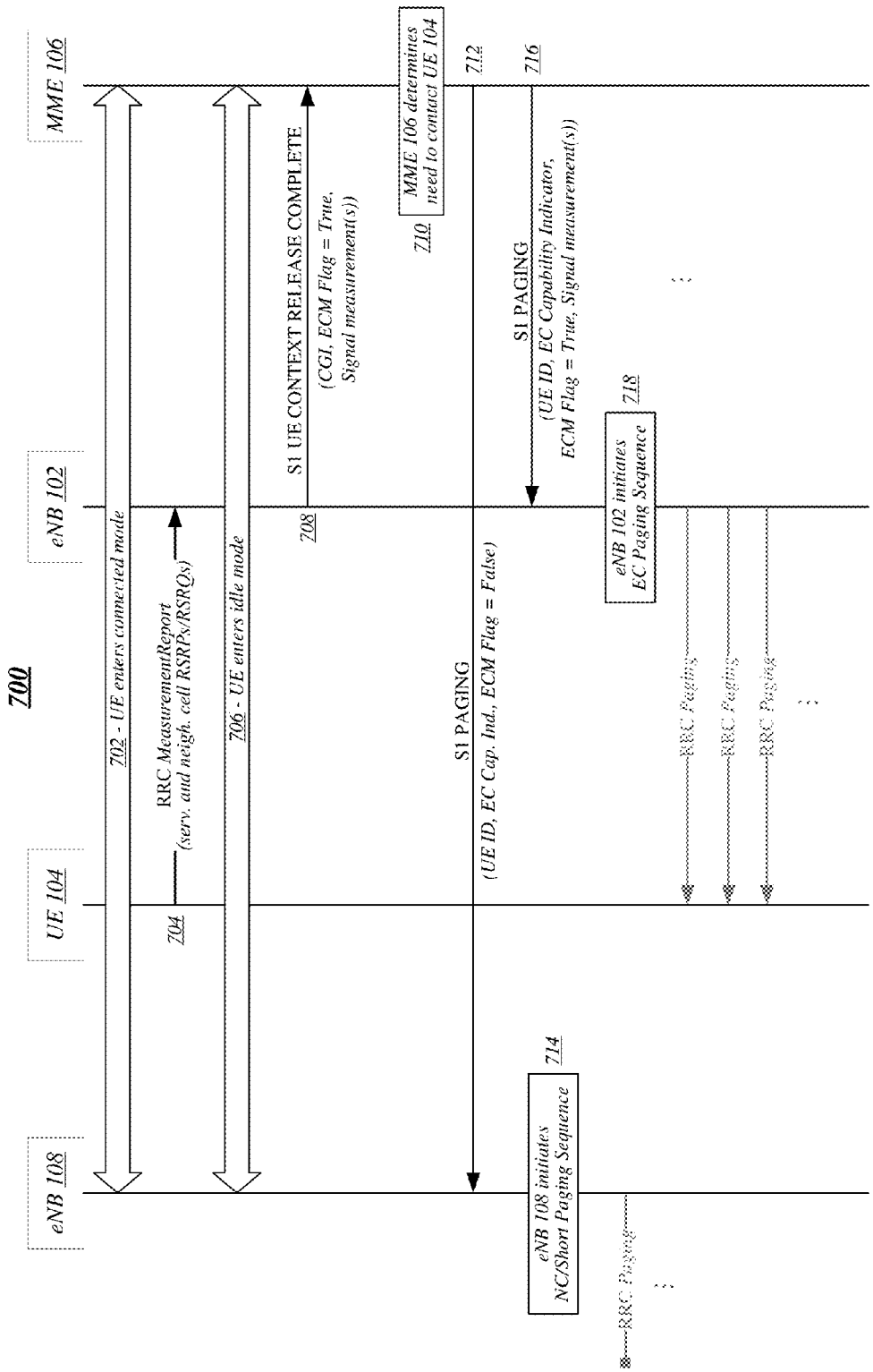
FIG. 7 illustrates an embodiment of a fifth communications flow.

FIG. 7 illustrates an example of a communications flow 700 that may be representative of the implementation of one or more adaptive paging techniques for EC-capable devices according to various embodiments. More particularly, communications flow 700 may be representative of various embodiments in which the use of EC paging sequences to page an EC-capable UE is limited to an area smaller than the tracking area of that UE, such as to the cell(s) served by a particular eNB within the tracking area. Communications flow 700 reflects an assumed example scenario in which UE 104 is initially camped in idle mode on a cell controlled by eNB 102, and is registered on a TA (or set of TAs) that includes the cell controlled by eNB 102 and a cell controlled by eNB 108. The embodiments are not limited to this example scenario.

As shown in FIG. 7, communications flow 700 may begin at 702, where UE 104 may enter the connected mode. In some embodiments, UE 104 may enter the connected mode in order to transfer data. In various other embodiments, UE 104 may enter the connected mode in order to perform signaling such as a tracking area update or an attach procedure. At 704, while operating in the connected mode, UE 104 may transmit an RRC MeasurementReport message to eNB 102. In various embodiments, the RRC MeasurementReport message may comprise RSRP and/or RSRQ measurements for the serving cell of UE 104, which in this case may be a cell served by eNB 102. In various embodiments, the RRC MeasurementReport message may additionally comprise RSRP and/or RSRQ measurements for one or more neighboring cells, which in this case may include the cell served by eNB 108. At 706, UE 104 may transition from the connected mode into an idle mode. It is assumed for the purpose of the remaining discussion that UE 104 is in the EC region of a cell served by eNB 102 at the time that it transitions out of the connected mode and into the idle mode.

At 708, as part of a procedure for transitioning UE 104 into the idle mode, eNB 102 may send an S1 UE CONTEXT RELEASE COMPLETE message to MME 106. In some embodiments, the S1 UE CONTEXT RELEASE COMPLETE message may contain a cell global identity (CGI) value corresponding to the cell that most recently served UE 104 while it operated in the connected mode. In various embodiments, the S1 UE CONTEXT RELEASE COM- PLETE message may additionally or alternatively contain an EC mode (ECM) flag set to indicate whether UE 104 is assumed to be located in the EC region of that cell. In various such embodiments, the EC mode flag may be set to indicate that UE 104 is assumed to be located in the EC region if UE 104 required EC mode procedures immediately prior to the release of its RRC connection at 706. In various embodiments, the S1 UE CONTEXT RELEASE COMPLETE message may additionally or alternatively contain a set of one or more signal measurements. In some such embodiments, the set of signal measurements may include signal strength and/or quality measurements provided by UE 104 for its most recent serving cell and/or for one or more neighboring cells, CGIs for any such neighboring cells, and/or the results of signal strength measurements performed by eNB 102 in order to determine the quality of its link with UE 104. In various embodiments, the S1 UE CONTEXT RELEASE COMPLETE message may additionally or alternatively contain a repetition count value indicating a number of paging repetitions that eNB 102 has previously used or recommends to be used in conjunction with paging UE 104. The embodiments are not limited to these examples.

At 710, MME 106 may determine that it needs to contact UE 104. For example, MME 106 may determine that it needs to contact UE 104 due to the arrival in the core network of DL data intended for UE 104. At 712, MME 106 may send an S1 PAGING message to eNB 108. In this example, MME 106 may be configured to limit the use of EC paging procedures to the cell that most recently served UE 104, which in this case may be a cell controlled by eNB 102. As such, in the S1 PAGING message that it sends to eNB 108, MME 106 may set an ECM flag to a value of FALSE. In response to receipt of this S1 PAGING message and a determination that the ECM flag is set to FALSE, eNB 108 may determine that it is not to initiate an EC paging sequence in order to page UE 104. In various embodiments, eNB 108 may therefore page UE 104 by initiating at 714 a same procedure as that used to page non-EC-capable UEs and/or EC-capable UEs located in NC regions of their cells. In various other embodiments, eNB 108 may initiate at 714 a short paging sequence, which may be the same as or similar to the short paging sequence that it initiates at 608 in communications flow 600 of FIG. 6. The embodiments are not limited in this context.

At 716, MME 106 may send an S1 PAGING message to eNB 102. Having determined—based, for example, on a CGI and an ECM flag comprised in the S1 UE CONTEXT RELEASE COMPLETE message received at 708—that UE 104 is assumed to be located within the EC region of a cell served by eNB 102, MME 106 may set an ECM flag comprised within this S1 PAGING message to a value of TRUE. In some embodiments, MME 106 may also one or more signal measurements within the S1 PAGING message, and the one or more signal measurements may include some or all of the one or more signal measurements provided by eNB 102 in S1 UE CONTEXT RELEASE COMPLETE message. Based on a determination that the ECM flag comprised in that S1 PAGING message is set to TRUE, eNB 102 may initiate an EC paging sequence at 718. In various embodiments, eNB 102 may serve multiple cells. In various such embodiments, eNB 102 may use the EC paging procedure in each of the multiple cells that it serves. In various other embodiments, eNB 102 may use the EC paging procedure only in the particular cell that served UE 104 at the time that UE 104 transitioned into the idle mode. In some embodiments, a CGI for the cell that served UE 104 at the time that UE 104 transitioned into the idle mode may be included within the S1 PAGING message sent at 716. In various embodiments, eNB 102 may select a number of paging repetitions to be performed during the EC paging sequence based on signal measurements comprised in that S1 PAGING message.

The approach reflected in communications flow 700 of FIG. 7—according to which the use of EC paging procedures may generally be targeted/limited to, for example, the particular cell in which the EC-capable UE was last known to be located—may work particularly well in cases where the EC-capable UE tends to remain stationary for extended periods of time, and thus the ECM flag tends to be accurate. In cases in which the EC-capable UE tends to change locations frequently, however, the ECM flag may tend to be unreliable. This may lead to unnecessary paging repetitions if an EC-capable UE that is assumed to reside in the EC region of a cell has moved into the NC region of that cell or another cell, and/or may lead to difficulty in reaching an EC-capable UE that is assumed to reside in the NC region of a cell but has moved to the EC region of that cell or another cell.

In order to mitigate these issues, EC-capable UEs may be configured to perform tracking area updates or service request procedures under certain circumstances. In various embodiments, an EC-capable UE may be configured to perform a tracking area update or service request procedure if it was in the NC region of a cell when it entered idle mode but has since moved into the EC region of that cell. In various embodiments, an EC-capable UE may additionally or alternatively be configured to perform a tracking area update or service request procedure if it was in the EC region of a cell when it entered idle mode but has since moved into the EC region of a different cell. In some embodiments, an EC-capable UE may additionally or alternatively be configured to perform a tracking area update or service request procedure when it was in the EC region of a cell when it entered idle mode but has since moved into the NC region of that cell or another cell. In various embodiments, using a tracking area update or service request procedure to notify the network of such an EC-to-NC transition may help the network avoid performing unnecessary paging repetitions when attempting to reach the UE. However, in various embodiments, it may be preferable to accept the potential overhead that may be associated with such unnecessary paging repetitions in order to avoid the overhead associated with using tracking area updates or service request procedures to notify the network of EC-to-NC transitions. The embodiments are not limited in this context.

In various embodiments, UE 104 may comprise an LCT UE of a type that is only able to communicate over a limited portion of the wireless spectrum utilized by eNBs 102 and 108. For example, in some embodiments, UE 104 may operate as a Cat-M UE, and in conjunction with operating in this fashion, may be limited to using a 1.4 MHz sub-band when communicating with eNB 102 or eNB 108. In various embodiments, an indication of UE 104's device category and/or associated limitations may be included within S1 PAGING messages sent by MME 106. For example, in various embodiments in which UE 104 operates as a Cat-M UE, a Category M indicator may be included within the S1 PAGING messages that MME 106 sends in any or all of communications flows 500, 600, and 700 of FIGS. 5, 6, and 7, respectively. In various embodiments, the inclusion of the Category M indicator may enable eNBs 102 and 108 to determine that in paging UE 104, they should transmit RRC Paging messages over the 1.4 MHz sub-band that UE 104 is capable of using. The embodiments are not limited to this example.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
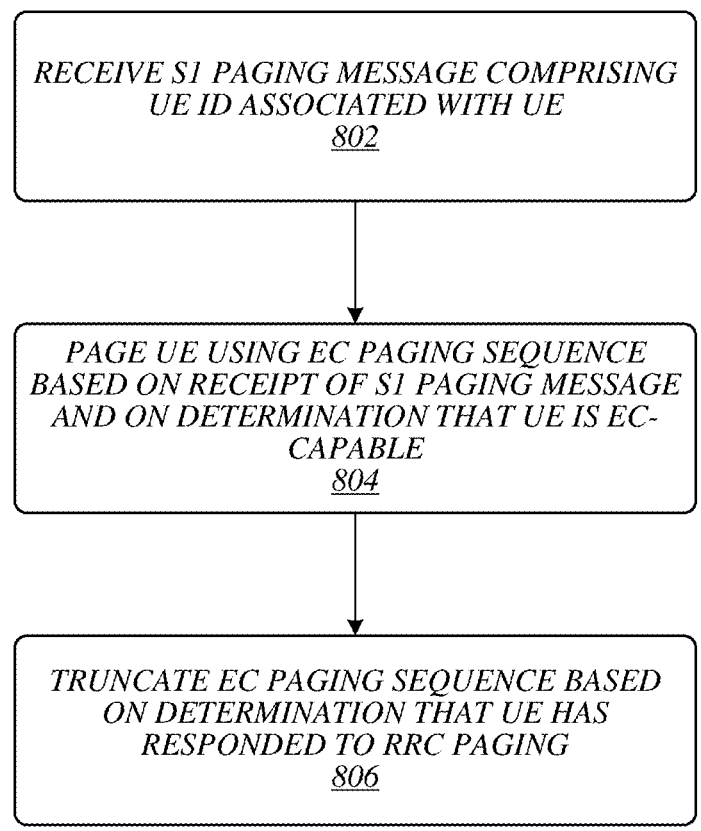
FIG. 8 illustrates an embodiment of a first logic flow.

FIG. 8 illustrates an example of a logic flow 800 that may be representative of some embodiments. More particularly, logic flow 800 may be representative of operations that may be performed in various embodiments by an eNB such as eNB 102. As shown in FIG. 8, an S1 paging message may be received at 802 that comprises a UE ID associated with a UE. For example, in operating environment 400 of FIG. 4, eNB 102 may receive S1 paging message 422 from MME 106, and the received S1 paging message 422 may comprise a UE ID associated with UE 104. At 804, based on receipt of the S1 paging message and on a determination that the UE is EC-capable, the UE may be paged using an EC paging sequence. For example, in operating environment 400 of FIG. 4, eNB 102 may page UE 104 using an EC paging sequence based on receipt of S1 paging message 422 and a determination that UE 104 is EC-capable. At 806, the EC paging sequence may be truncated based on a determination that the UE has responded to RRC paging. For example, in operating environment 400 of FIG. 4, eNB 102 may truncate the EC paging sequence based on a determination that UE 104 has responded to RRC paging within a cell served by eNB 102 or a cell served by eNB 108. The embodiments are not limited to these examples.

Figure 9:
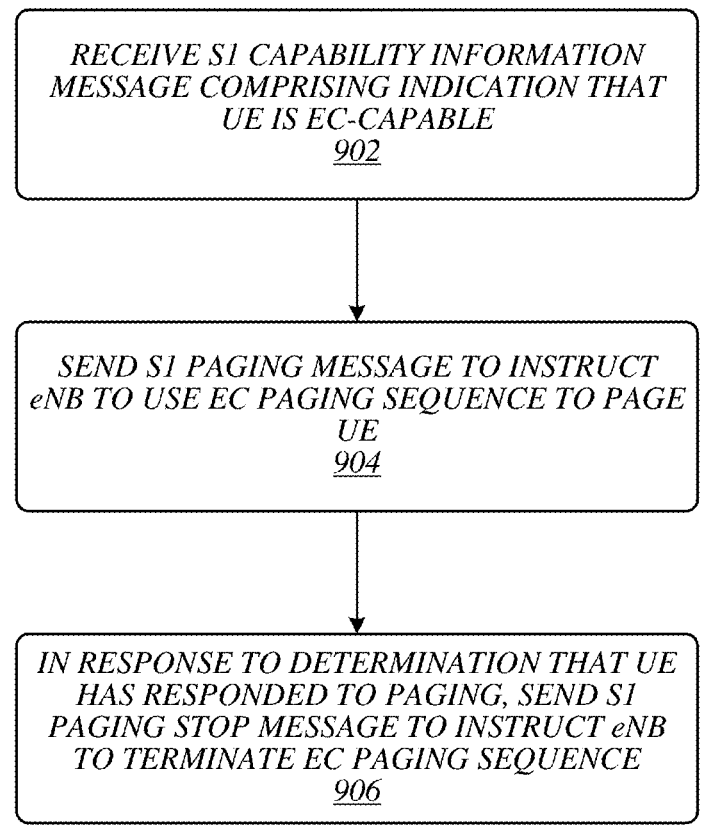
FIG. 9 illustrates an embodiment of a second logic flow.

FIG. 9 illustrates an example of a logic flow 900 that may be representative of some embodiments. More particularly, logic flow 900 may be representative of operations that may be performed in various embodiments by an MME such as MME 106. As shown in FIG. 9, an S1 capability information message may be received at 902 that comprises an indication that a UE is EC-capable. For example, in operating environment 400 of FIG. 4, MME 106 may receive capability information message 416 from eNB 102, and the received capability information message 416 may comprise EC capability information 418 indicating that UE 104 is EC-capable. At 904, an S1 paging message may be sent to instruct an eNB to use an EC paging sequence to page the UE. For example, in operating environment 400 of FIG. 4, MME 106 may send an S1 paging message 422 to instruct eNB 108 to use an EC paging sequence to page UE 104. At 906, in response to a determination that the UE has responded to paging, an S1 paging stop message may be sent to instruct the eNB to terminate the EC paging sequence. For example, in operating environment 400 of FIG. 4, MME 106 may send an S1 paging stop message, such as the message sent at 524 in communications flow 500 of FIG. 5, in order to instruct eNB 108 to terminate the EC paging sequence. The embodiments are not limited to these examples.

Figure 10:
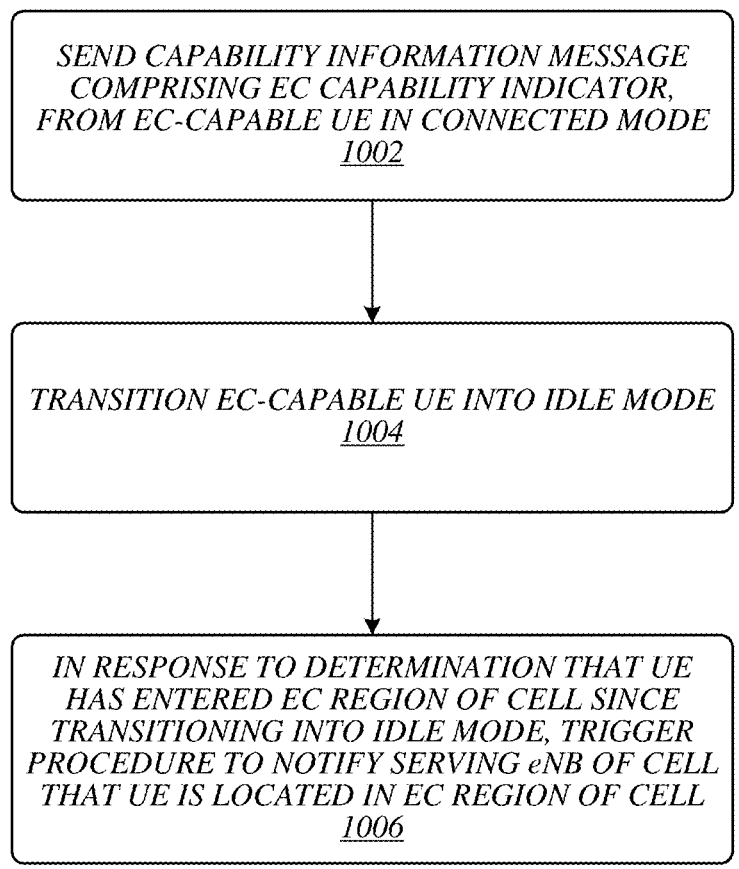
FIG. 10 illustrates an embodiment of a third logic flow.

FIG. 10 illustrates an example of a logic flow 1000 that may be representative of some embodiments. More particularly, logic flow 1000 may be representative of operations that may be performed in various embodiments by logic circuitry at a UE such as UE 104. As shown in FIG. 10, a capability information message comprising an EC capability indicator may be sent at 1002 from an EC-capable UE operating in a connected mode. For example, while UE 104 operates in an RRC_CONNECTED state in operating environment 400 of FIG. 4, capability information message 410 may be sent to eNB 102 and may comprise an EC capability indicator to indicate that UE 104 is EC-capable. At 1004, the EC-capable UE may be transitioned into an idle mode. For example, in operating environment 400 of FIG. 4, UE 104 may be transitioned into an RRC_IDLE state. At 1006, in response to a determination that the EC-capable UE has entered the EC region of a cell since transitioning into the idle mode, a procedure may be triggered to notify a serving eNB of the cell that the UE is located in the EC region of the cell. For example, in operating environment 400 of FIG. 4, a Tracking Area Update procedure or a Service Request procedure may be triggered at UE 104 in order to notify eNB 102 that UE 104 has moved into the EC region of the cell served by eNB 102. In some embodiments, the UE may have moved from the NC region of the cell to the EC region of the cell. In various other embodiments, the UE may have moved from the NC or EC region of another cell to the EC region of the cell. The embodiments are not limited to these examples.

Figure 11:
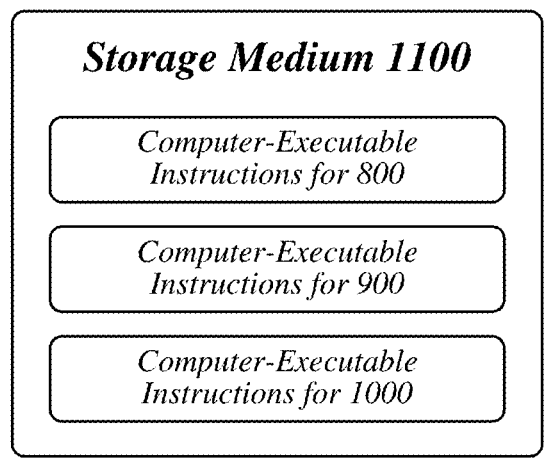
FIG. 11 illustrates an embodiment of a storage medium.

FIG. 11 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or more of logic flow 800 of FIG. 8, logic flow 900 of FIG. 9, and logic flow 1000 of FIG. 10. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 12:
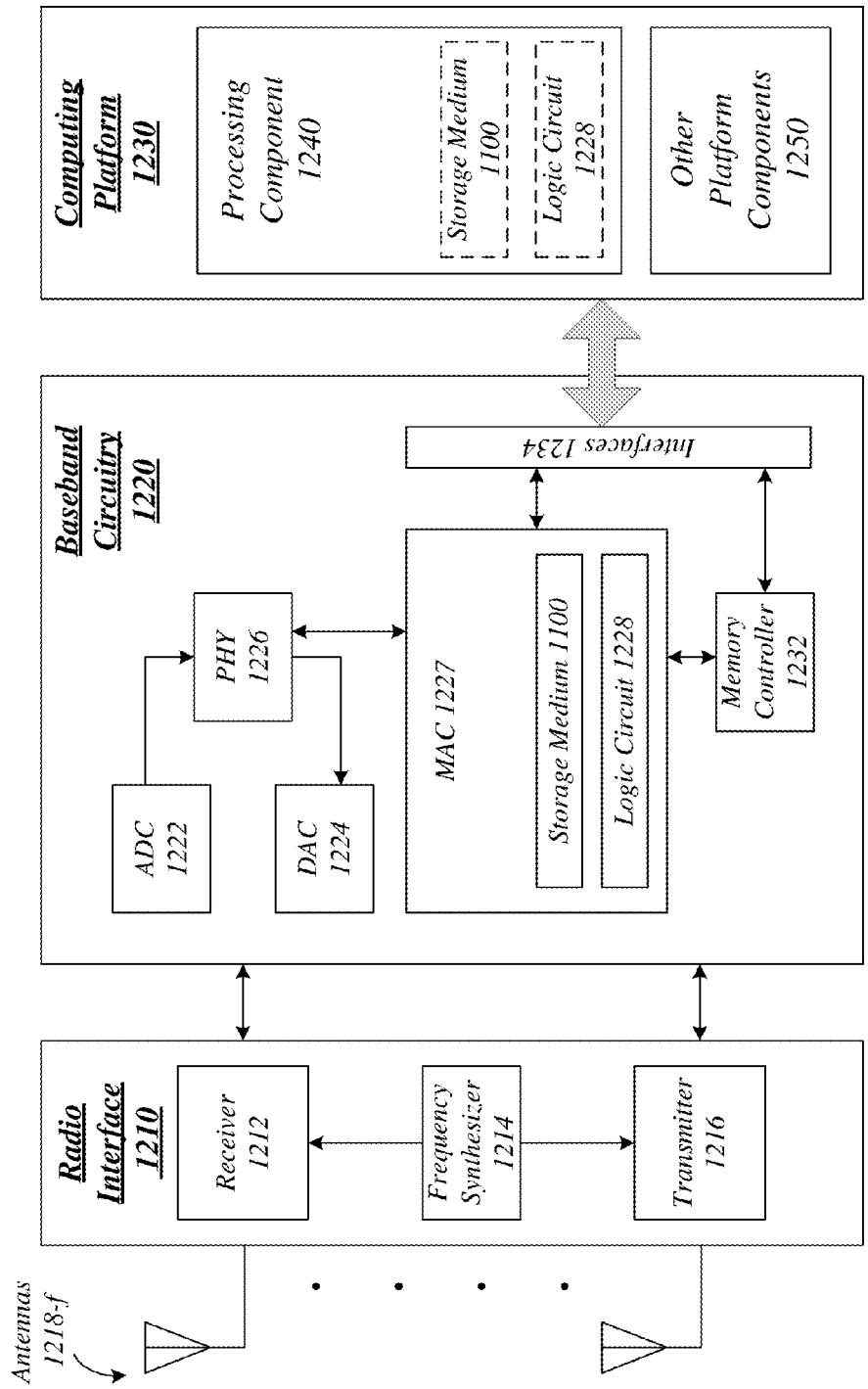
FIG. 12 illustrates an embodiment of a device.

FIG. 12 illustrates an embodiment of a communications device 1200 that may implement one or more of eNB 102, UE 104, MME 106, and eNB 108 of FIGS. 1-7, logic flow 800 of FIG. 8, logic flow 900 of FIG. 9, logic flow 1000 of FIG. 10, and storage medium 1100 of FIG. 11. In various embodiments, device 1200 may comprise a logic circuit 1228. The logic circuit 1228 may include physical circuits to perform operations described for one or more of eNB 102, UE 104, MME 106, and eNB 108 of FIGS. 1-7, logic flow 800 of FIG. 8, logic flow 900 of FIG. 9, and logic flow 1000 of FIG. 10, for example. As shown in FIG. 12, device 1200 may include a radio interface 1210, baseband circuitry 1220, and computing platform 1230, although the embodiments are not limited to this configuration.

The device 1200 may implement some or all of the structure and/or operations for one or more of eNB 102, UE 104, MME 106, and eNB 108 of FIGS. 1-7, logic flow 800 of FIG. 8, logic flow 900 of FIG. 9, logic flow 1000 of FIG. 10, storage medium 1100 of FIG. 11, and logic circuit 1228 in a single computing entity, such as entirely within a single device. Alternatively, the device 1200 may distribute portions of the structure and/or operations for one or more of eNB 102, UE 104, MME 106, and eNB 108 of FIGS. 1-7, logic flow 800 of FIG. 8, logic flow 900 of FIG. 9, logic flow 1000 of FIG. 10, storage medium 1100 of FIG. 11, and logic circuit 1228 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, a mixer for down-converting received RF signals, an analog-to-digital converter 1222 for converting analog signals to digital form, a digital-to-analog converter 1224 for converting digital signals to analog form, and a mixer for up-converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for one or more of eNB 102, UE 104, MME 106, and eNB 108 of FIGS. 1-7, logic flow 800 of FIG. 8, logic flow 900 of FIG. 9, logic flow 1000 of FIG. 10, storage medium 1100 of FIG. 11, and logic circuit 1228 using the processing component 1240. The processing component 1240 (and/or PHY 1226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 13 illustrates an embodiment of a broadband wireless access system 1300. As shown in FIG. 13, broadband wireless access system 1300 may be an internet protocol (IP) type network comprising an internet 1310 type network or the like that is capable of supporting mobile wireless access and/or fixed wireless access to internet 1310. In one or more embodiments, broadband wireless access system 1300 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1300, radio access networks (RANs) 1312 and 1318 are capable of coupling with evolved node Bs (eNBs) 1314 and 1320, respectively, to provide wireless communication between one or more fixed devices 1316 and internet 1310 and/or between or one or more mobile devices 1322 and Internet 1310. One example of a fixed device 1316 and a mobile device 1322 is device 1200 of FIG. 12, with the fixed device 1316 comprising a stationary version of device 1200 and the mobile device 1322 comprising a mobile version of device 1200. RANs 1312 and 1318 may implement profiles that are capable of defining the mapping of network functions to one or more physical entities on broadband wireless access system 1300. eNBs 1314 and 1320 may comprise radio equipment to provide RF communication with fixed device 1316 and/or mobile device 1322, such as described with reference to device 1200, and may comprise, for example, the PHY and MAC layer equipment in compliance with a 3GPP LTE Specification or an IEEE 802.16 Standard. eNBs 1314 and 1320 may further comprise an IP backbone to couple to Internet 1310 via RANs 1312 and 1318, respectively, although the scope of the claimed subject matter is not limited in these respects.

Broadband wireless access system 1300 may further comprise a visited core network (CN) 1324 and/or a home CN 1326, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1324 and/or home CN 1326, and the scope of the claimed subject matter is not limited in these respects. Visited CN 1324 may be referred to as a visited CN in the case where visited CN 1324 is not part of the regular service provider of fixed device 1316 or mobile device 1322, for example where fixed device 1316 or mobile device 1322 is roaming away from its respective home CN 1326, or where broadband wireless access system 1300 is part of the regular service provider of fixed device 1316 or mobile device 1322 but where broadband wireless access system 1300 may be in another location or state that is not the main or home location of fixed device 1316 or mobile device 1322. The embodiments are not limited in this context.

Fixed device 1316 may be located anywhere within range of one or both of eNBs 1314 and 1320, such as in or near a home or business to provide home or business customer broadband access to Internet 1310 via eNBs 1314 and 1320 and RANs 1312 and 1318, respectively, and home CN 1326. It is worthy of note that although fixed device 1316 is generally disposed in a stationary location, it may be moved to different locations as needed. Mobile device 1322 may be utilized at one or more locations if mobile device 1322 is within range of one or both of eNBs 1314 and 1320, for example. In accordance with one or more embodiments, operation support system (OSS) 1328 may be part of broadband wireless access system 1300 to provide management functions for broadband wireless access system 1300 and to provide interfaces between functional entities of broadband wireless access system 1300. Broadband wireless access system 1300 of FIG. 13 is merely one type of wireless network showing a certain number of the components of broadband wireless access system 1300, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising at least one memory, and logic for an evolved node B (eNB), at least a portion of the logic comprised in hardware coupled to the at least one memory, the logic to receive an S1 paging message comprising a user equipment (UE) identifier (ID) associated with a UE, page the UE using an extended coverage (EC) paging sequence based on receipt of the S1 paging message and on a determination that the UE is EC-capable, the EC paging sequence comprising a series of transmissions of a radio resource control (RRC) paging message, and truncate the EC paging sequence based on a determination that the UE has responded to RRC paging.

Example 2 is the apparatus of Example 1, the logic to determine that the UE is EC-capable based on an EC capability indicator comprised in the S1 paging message.

Example 3 is the apparatus of Example 1, the logic to page the UE using the EC paging sequence based on the receipt of the S1 paging message, the determination that the UE is EC-capable, and a determination that an EC-mode (ECM) flag comprised in the S1 paging message is set to indicate that the EC paging sequence is to be used to page the UE.

Example 4 is the apparatus of Example 1, the logic to select a number of paging repetitions to be comprised in the EC paging sequence based on one or more signal measurements comprised in the S1 paging message.

Example 5 is the apparatus of Example 1, the logic to identify a number of paging repetitions to be comprised in the EC paging sequence based on a repetition count value comprised in the S1 paging message.

Example 6 is the apparatus of Example 1, the logic to receive a second S1 paging message comprising a second UE ID associated with a second UE, determine that the second UE is EC-capable based on an EC capability indicator comprised in the second S1 paging message, and page the second UE using a short paging sequence based on receipt of the second S1 paging message and on a determination that an EC-mode (ECM) flag comprised in the second S1 paging message is set to indicate that the EC paging sequence is not to be used to page the second UE.

Example 7 is the apparatus of Example 6, the short paging sequence to comprise transmission of a single RRC paging message.

Example 8 is the apparatus of Example 6, the short paging sequence to comprise transmission of two or three RRC paging messages.

Example 9 is the apparatus of Example 1, the logic to use the EC paging sequence to page a paging group comprising the UE and one or more additional UEs, and truncate the EC paging sequence based on the determination that the UE has responded to the RRC paging message and on a determination that each of the one or more additional UEs have also responded to RRC paging.

Example 10 is the apparatus of Example 1, the logic to determine that the UE has responded to RRC paging in response to receipt of an RRCConnectionRequest message or an RRCConnectionSetupComplete message from the UE.

Example 11 is the apparatus of Example 1, the logic to determine that the UE has responded to RRC paging in response to receipt of an S1 INITIAL CONTEXT SETUP REQUEST message from a mobility management entity (MME).

Example 12 is the apparatus of Example 1, the logic to determine that the UE has responded to RRC paging in response to receipt of an S1 PAGING STOP message from a mobility management entity (MME).

Example 13 is the apparatus of Example 1, the logic to page the UE using a short paging sequence in response to receipt of the S1 paging message, page the UE using the EC paging sequence in response to receipt of a second S1 paging message and the determination that the UE is EC-capable.

Example 14 is the apparatus of Example 13, the short paging sequence to comprise transmission of a single RRC paging message.

Example 15 is the apparatus of Example 13, the short paging sequence to comprise transmission of two or three RRC paging messages.

Example 16 is the apparatus of Example 13, the logic to determine that the S1 paging message corresponds to an initial attempt to reach the UE based on an indicator comprised in the S1 paging message, and page the UE using the short paging sequence in response to receipt of the S1 paging message and the determination that the S1 paging message corresponds to the initial attempt to reach the UE.

Example 17 is the apparatus of Example 16, the indicator to comprise a paging count value.

Example 18 is the apparatus of Example 16, the indicator to comprise a single-bit indicator.

Example 19 is the apparatus of Example 13, the logic to determine that the second S1 paging message corresponds to a repeat attempt to reach the UE based on an indicator comprised in the second S1 paging message, and page the UE using the EC paging sequence in response to receipt of the second S1 paging message and the determination that the second S1 paging message corresponds to the repeat attempt to reach the UE.

Example 20 is the apparatus of Example 19, the indicator to comprise a paging count value.

Example 21 is the apparatus of Example 19, the indicator to comprise a single-bit indicator.

Example 22 is a system, comprising an apparatus according to any of Examples 1 to 21, and at least one radio frequency (RF) transceiver.

Example 23 is the system of Example 22, comprising at least one RF antenna.

Example 24 is at least one non-transitory computer-readable storage medium comprising a set of instructions that, in response to being executed at a mobility management entity (MME), cause the MME to receive an S1 capability information message comprising an indication that user equipment (UE) is extended coverage (EC)-capable, send an S1 paging message to instruct an evolved node B (eNB) to use an EC paging sequence to page the UE, and in response to a determination that the UE has responded to paging, send an S1 paging stop message to instruct the eNB to terminate the EC paging sequence.

Example 25 is the at least one non-transitory computer-readable storage medium of Example 24, comprising instructions that, in response to being executed at the MME, cause the MME to determine that the UE has responded to paging based on receipt of an S1 message from a second eNB.

Example 26 is the at least one non-transitory computer-readable storage medium of Example 25, the S1 message received from the second eNB to comprise an S1 INITIAL UE MESSAGE message.

Example 27 is the at least one non-transitory computer-readable storage medium of Example 24, the S1 paging message to comprise a UE identifier (ID) for the UE.

Example 28 is the at least one non-transitory computer-readable storage medium of Example 24, the S1 paging message to comprise an EC capability indicator to indicate that the UE is EC-capable.

Example 29 is the at least one non-transitory computer-readable storage medium of Example 24, the S1 paging message to comprise a parameter indicating that the EC paging sequence is to be used.

Example 30 is the at least one non-transitory computer-readable storage medium of Example 29, the parameter to comprise a repetition count value indicating a same number of paging repetitions as are to be comprised in the EC paging sequence.

Example 31 is the at least one non-transitory computer-readable storage medium of Example 29, the parameter to indicate that the S1 paging message comprises a repeat attempt to reach the UE.

Example 32 is the at least one non-transitory computer-readable storage medium of Example 31, the parameter to comprise a paging count value.

Example 33 is the at least one non-transitory computer-readable storage medium of Example 31, the parameter to comprise a single-bit indicator.

Example 34 is the at least one non-transitory computer-readable storage medium of Example 24, comprising instructions that, in response to being executed at the MME, cause the MME to determine to instruct the eNB to use the EC paging sequence to page the UE in response to a determination that the eNB serves a cell in which the UE was last known to be located.

Example 35 is the at least one non-transitory computer-readable storage medium of Example 34, the S1 paging message to comprise a cell global identity (CGI) value corresponding to the cell.

Example 36 is the at least one non-transitory computer-readable storage medium of Example 34, the S1 paging message to comprise an EC-mode (ECM) flag that is set to indicate that the EC paging sequence is to be used to page the UE.

Example 37 is the at least one non-transitory computer-readable storage medium of Example 36, comprising instructions that, in response to being executed at the MME, cause the MME to send a second S1 paging message to instruct a second eNB to use a short paging sequence to page the UE, the second S1 paging message to comprise an EC-mode flag that is set to indicate that the EC paging sequence is not to be used to page the UE.

Example 38 is the at least one non-transitory computer-readable storage medium of Example 24, comprising instructions that, in response to being executed at the MME, cause the MME to instruct the eNB to use a short paging sequence to page the UE, and based on a determination that the UE has not responded to paging during the short paging sequence, send the S1 paging message to instruct the eNB to use the EC paging sequence to page the UE.

Example 39 is the at least one non-transitory computer-readable storage medium of Example 38, the short paging sequence to comprise transmission of a single RRC paging message.

Example 40 is the at least one non-transitory computer-readable storage medium of Example 38, the short paging sequence to comprise transmission of two or three RRC paging messages.

Example 41 is the at least one non-transitory computer-readable storage medium of Example 38, comprising instructions that, in response to being executed at the MME, cause the MME to instruct the eNB to use the short paging sequence to page the UE by sending an S1 paging message comprising a UE identifier (ID) for the UE and a parameter indicating that the short paging sequence is to be used.

Example 42 is the at least one non-transitory computer-readable storage medium of Example 41, the parameter to comprise a repetition count value indicating a same number of paging repetitions as are to be comprised in the short paging sequence.

Example 43 is the at least one non-transitory computer-readable storage medium of Example 41, the parameter to comprise an indication of an initial attempt to reach the UE.

Example 44 is the at least one non-transitory computer-readable storage medium of Example 43, the parameter to comprise a paging count value.

Example 45 is the at least one non-transitory computer-readable storage medium of Example 43, the parameter to comprise a single-bit indicator.

Example 46 is a method, comprising sending, by a radio interface of extended coverage (EC)-capable user equipment (UE) in a connected state, a capability information message comprising an EC capability indicator, transitioning the EC-capable UE into an idle state, and in response to a determination that the EC-capable UE has entered an EC region of a cell since transitioning into the idle state, triggering a procedure to notify a serving evolved node B (eNB) of the cell that the EC-capable UE is located in the EC region of the cell.

Example 47 is the method of Example 46, the capability information message to comprise a radio resource control (RRC) UECapabilityInformation message.

Example 48 is the method of Example 46, the EC-capable UE to comprise a limited-capability type (LCT) UE.

Example 49 is the method of Example 48, the capability information message to comprise the EC capability indicator and LCT information to indicate that the EC-capable UE comprises an LCT UE.

Example 50 is the method of Example 49, the capability information message to comprise a radio resource control (RRC) UECapabilityInformation message, the LCT information to comprise a Category 0 indicator or a Category M indicator.

Example 51 is the method of Example 46, the procedure to comprise a Tracking Area Update procedure.

Example 52 is the method of Example 46, the procedure to comprise a Service Request procedure.

Example 53 is the method of Example 46, comprising determining that the EC-capable UE has entered the EC region of the cell based on one or more signal measurements for the cell.

Example 54 is the method of Example 46, comprising determining that the EC-capable UE has entered the EC region of the cell based on a determination that the EC-capable UE has entered the cell from an EC region of a second cell.

Example 55 is at least one non-transitory computer-readable storage medium comprising a set of instructions that, in response to being executed on a computing device, cause the computing device to perform a method according to any of Examples 46 to 54.

Example 56 is an apparatus, comprising means for performing a method according to any of Examples 46 to 54.

Example 57 is a system, comprising the apparatus of Example 56, and at least one radio frequency (RF) transceiver.

Example 58 is the system of Example 57, comprising at least one RF antenna.

Example 59 is the system of Example 58, comprising a touchscreen display.

Example 60 is an apparatus, comprising means for receiving, at a mobility management entity (MME), an S1 capability information message comprising an indication that user equipment (UE) is extended coverage (EC)-capable, means for sending an S1 paging message to instruct an evolved node B (eNB) to use an EC paging sequence to page the UE, and means for sending an S1 paging stop message to instruct the eNB to terminate the EC paging sequence in response to a determination that the UE has responded to paging.

Example 61 is the apparatus of Example 60, comprising means for determining that the UE has responded to paging based on receipt of an S1 message from a second eNB.

Example 62 is the apparatus of Example 61, the S1 message received from the second eNB to comprise an S1 INITIAL UE MESSAGE message.

Example 63 is the apparatus of Example 60, the S1 paging message to comprise a UE identifier (ID) for the UE.

Example 64 is the apparatus of Example 60, the S1 paging message to comprise an EC capability indicator to indicate that the UE is EC-capable.

Example 65 is the apparatus of Example 60, the S1 paging message to comprise a parameter indicating that the EC paging sequence is to be used.

Example 66 is the apparatus of Example 65, the parameter to comprise a repetition count value indicating a same number of paging repetitions as are to be comprised in the EC paging sequence.

Example 67 is the apparatus of Example 65, the parameter to indicate that the S1 paging message comprises a repeat attempt to reach the UE.

Example 68 is the apparatus of Example 67, the parameter to comprise a paging count value.

Example 69 is the apparatus of Example 67, the parameter to comprise a single-bit indicator.

Example 70 is the apparatus of Example 60, comprising means for determining to instruct the eNB to use the EC paging sequence to page the UE in response to a determination that the eNB serves a cell in which the UE was last known to be located.

Example 71 is the apparatus of Example 70, the S1 paging message to comprise a cell global identity (CGI) value corresponding to the cell.

Example 72 is the apparatus of Example 70, the S1 paging message to comprise an EC-mode (ECM) flag that is set to indicate that the EC paging sequence is to be used to page the UE.

Example 73 is the apparatus of Example 72, comprising means for sending a second S1 paging message to instruct a second eNB to use a short paging sequence to page the UE, the second S1 paging message to comprise an EC-mode flag that is set to indicate that the EC paging sequence is not to be used to page the UE.

Example 74 is the apparatus of Example 60, comprising means for instructing the eNB to use a short paging sequence to page the UE, and means for sending the S1 paging message to instruct the eNB to use the EC paging sequence to page the UE based on a determination that the UE has not responded to paging during the short paging sequence.

Example 75 is the apparatus of Example 74, the short paging sequence to comprise transmission of a single RRC paging message.

Example 76 is the apparatus of Example 74, the short paging sequence to comprise transmission of two or three RRC paging messages.

Example 77 is the apparatus of Example 74, comprising means for instructing the eNB to use the short paging sequence to page the UE by sending an S1 paging message comprising a UE identifier (ID) for the UE and a parameter indicating that the short paging sequence is to be used.

Example 78 is the apparatus of Example 77, the parameter to comprise a repetition count value indicating a same number of paging repetitions as are to be comprised in the short paging sequence.

Example 79 is the apparatus of Example 77, the parameter to comprise an indication of an initial attempt to reach the UE.

Example 80 is the apparatus of Example 79, the parameter to comprise a paging count value.

Example 81 is the apparatus of Example 79, the parameter to comprise a single-bit indicator.

Example 82 is a system, comprising an apparatus according to any of Examples 60 to 81, and at least one network interface.

Example 83 is an apparatus, comprising at least one memory, and logic, at least a portion of which is in hardware coupled to the at least one memory, the logic to send, from extended coverage (EC)-capable user equipment (UE) in a connected state, a capability information message comprising an EC capability indicator, transition the EC-capable UE into an idle state, and in response to a determination that the EC-capable UE has entered an EC region of a cell since transitioning into the idle state, trigger a procedure to notify a serving evolved node B (eNB) of the cell that the EC-capable UE is located in the EC region of the cell.

Example 84 is the apparatus of Example 83, the capability information message to comprise a radio resource control (RRC) UECapabilityInformation message.

Example 85 is the apparatus of Example 83, the EC-capable UE to comprise a limited-capability type (LCT) UE.

Example 86 is the apparatus of Example 85, the capability information message to comprise the EC capability indicator and LCT information to indicate that the EC-capable UE comprises an LCT UE.

Example 87 is the apparatus of Example 86, the capability information message to comprise a radio resource control (RRC) UECapabilityInformation message, the LCT information to comprise a Category 0 indicator or a Category M indicator.

Example 88 is the apparatus of Example 83, the procedure to comprise a Tracking Area Update procedure.

Example 89 is the apparatus of Example 83, the procedure to comprise a Service Request procedure.

Example 90 is the apparatus of Example 83, the logic to determine that the EC-capable UE has entered the EC region of the cell based on one or more signal measurements for the cell.

Example 91 is the apparatus of Example 83, the logic to determine that the EC-capable UE has entered the EC region of the cell based on a determination that the EC-capable UE has entered the cell from an EC region of a second cell.

Example 92 is a system, comprising an apparatus according to any of Examples 83 to 91, and at least one radio frequency (RF) transceiver.

Example 93 is the system of Example 92, comprising at least one RF antenna.

Example 94 is the system of Example 93, comprising a touchscreen display.

Example 95 is a method, comprising receiving, at an evolved node B (eNB), an S1 paging message comprising a user equipment (UE) identifier (ID) associated with a UE, paging the UE, by a radio interface of the eNB, using an extended coverage (EC) paging sequence based on receipt of the S1 paging message and on a determination that the UE is EC-capable, the EC paging sequence comprising a series of transmissions of a radio resource control (RRC) paging message, and truncating the EC paging sequence based on a determination that the UE has responded to RRC paging.

Example 96 is the method of Example 95, comprising determining that the UE is EC-capable based on an EC capability indicator comprised in the S1 paging message.

Example 97 is the method of Example 95, comprising paging the UE using the EC paging sequence based on the receipt of the S1 paging message, the determination that the UE is EC-capable, and a determination that an EC-mode (ECM) flag comprised in the S1 paging message is set to indicate that the EC paging sequence is to be used to page the UE.

Example 98 is the method of Example 95, comprising selecting a number of paging repetitions to be comprised in the EC paging sequence based on one or more signal measurements comprised in the S1 paging message.

Example 99 is the method of Example 95, comprising identifying a number of paging repetitions to be comprised in the EC paging sequence based on a repetition count value comprised in the S1 paging message.

Example 100 is the method of Example 95, comprising receiving a second S1 paging message comprising a second UE ID associated with a second UE, determining that the second UE is EC-capable based on an EC capability indicator comprised in the second S1 paging message, and paging the second UE using a short paging sequence based on receipt of the second S1 paging message and on a determination that an EC-mode (ECM) flag comprised in the second S1 paging message is set to indicate that the EC paging sequence is not to be used to page the second UE.

Example 101 is the method of Example 100, the short paging sequence to comprise transmission of a single RRC paging message.

Example 102 is the method of Example 100, the short paging sequence to comprise transmission of two or three RRC paging messages.

Example 103 is the method of Example 95, comprising using the EC paging sequence to page a paging group comprising the UE and one or more additional UEs, and truncating the EC paging sequence based on the determination that the UE has responded to the RRC paging message and on a determination that each of the one or more additional UEs have also responded to RRC paging.

Example 104 is the method of Example 95, comprising determining that the UE has responded to RRC paging in response to receipt of an RRCConnectionRequest message or an RRCConnectionSetupComplete message from the UE.

Example 105 is the method of Example 95, comprising determining that the UE has responded to RRC paging in response to receipt of an S1 INITIAL CONTEXT SETUP REQUEST message from a mobility management entity (MME).

Example 106 is the method of Example 95, comprising determining that the UE has responded to RRC paging in response to receipt of an S1 PAGING STOP message from a mobility management entity (MME).

Example 107 is the method of Example 95, comprising paging the UE using a short paging sequence in response to receipt of the S1 paging message, paging the UE using the EC paging sequence in response to receipt of a second S1 paging message and the determination that the UE is EC-capable.

Example 108 is the method of Example 107, the short paging sequence to comprise transmission of a single RRC paging message.

Example 109 is the method of Example 107, the short paging sequence to comprise transmission of two or three RRC paging messages.

Example 110 is the method of Example 107, comprising determining that the S1 paging message corresponds to an initial attempt to reach the UE based on an indicator comprised in the S1 paging message, and paging the UE using the short paging sequence in response to receipt of the S1 paging message and the determination that the S1 paging message corresponds to the initial attempt to reach the UE.

Example 111 is the method of Example 110, the indicator to comprise a paging count value.

Example 112 is the method of Example 110, the indicator to comprise a single-bit indicator.

Example 113 is the method of Example 107, comprising determining that the second S1 paging message corresponds to a repeat attempt to reach the UE based on an indicator comprised in the second S1 paging message, and paging the UE using the EC paging sequence in response to receipt of the second S1 paging message and the determination that the second S1 paging message corresponds to the repeat attempt to reach the UE.

Example 114 is the method of Example 113, the indicator to comprise a paging count value.

Example 115 is the method of Example 113, the indicator to comprise a single-bit indicator.

Example 116 is at least one non-transitory computer-readable storage medium comprising a set of instructions that, in response to being executed on a computing device, cause the computing device to perform a method according to any of Examples 95 to 115.

Example 117 is an apparatus, comprising means for performing a method according to any of Examples 95 to 115.

Example 118 is a system, comprising the apparatus of Example 117, and at least one radio frequency (RF) transceiver.

Example 119 is the system of Example 118, comprising at least one RF antenna.

Example 120 is at least one non-transitory computer-readable storage medium comprising a set of instructions that, in response to being executed on a computing device, cause the computing device to send, from extended coverage (EC)-capable user equipment (UE) in a connected state, a capability information message comprising an EC capability indicator, transition the EC-capable UE into an idle state, and in response to a determination that the EC-capable UE has entered an EC region of a cell since transitioning into the idle state, trigger a procedure to notify a serving evolved node B (eNB) of the cell that the EC-capable UE is located in the EC region of the cell.

Example 121 is the at least one non-transitory computer-readable storage medium of Example 120, the capability information message to comprise a radio resource control (RRC) UECapabilityInformation message.

Example 122 is the at least one non-transitory computer-readable storage medium of Example 120, the EC-capable UE to comprise a limited-capability type (LCT) UE.

Example 123 is the at least one non-transitory computer-readable storage medium of Example 122, the capability information message to comprise the EC capability indicator and LCT information to indicate that the EC-capable UE comprises an LCT UE.

Example 124 is the at least one non-transitory computer-readable storage medium of Example 123, the capability information message to comprise a radio resource control (RRC) UECapabilityInformation message, the LCT information to comprise a Category 0 indicator or a Category M indicator.

Example 125 is the at least one non-transitory computer-readable storage medium of Example 120, the procedure to comprise a Tracking Area Update procedure.

Example 126 is the at least one non-transitory computer-readable storage medium of Example 120, the procedure to comprise a Service Request procedure.

Example 127 is the at least one non-transitory computer-readable storage medium of Example 120, comprising instructions that, in response to being executed at the computing device, cause the computing device to determine that the EC-capable UE has entered the EC region of the cell based on one or more signal measurements for the cell.

Example 128 is the at least one non-transitory computer-readable storage medium of Example 120, comprising instructions that, in response to being executed at the computing device, cause the computing device to determine that the EC-capable UE has entered the EC region of the cell based on a determination that the EC-capable UE has entered the cell from an EC region of a second cell.

Example 129 is an apparatus, comprising means for receiving, at an evolved node B (eNB), an S1 paging message comprising a user equipment (UE) identifier (ID) associated with a UE, means for paging the UE using an extended coverage (EC) paging sequence based on receipt of the S1 paging message and on a determination that the UE is EC-capable, the EC paging sequence comprising a series of transmissions of a radio resource control (RRC) paging message, and means for truncating the EC paging sequence based on a determination that the UE has responded to RRC paging.

Example 130 is the apparatus of Example 129, comprising means for determining that the UE is EC-capable based on an EC capability indicator comprised in the S1 paging message.

Example 131 is the apparatus of Example 129, comprising means for paging the UE using the EC paging sequence based on the receipt of the S1 paging message, the determination that the UE is EC-capable, and a determination that an EC-mode (ECM) flag comprised in the S1 paging message is set to indicate that the EC paging sequence is to be used to page the UE.

Example 132 is the apparatus of Example 129, comprising means for selecting a number of paging repetitions to be comprised in the EC paging sequence based on one or more signal measurements comprised in the S1 paging message.

Example 133 is the apparatus of Example 129, comprising means for identifying a number of paging repetitions to be comprised in the EC paging sequence based on a repetition count value comprised in the S1 paging message.

Example 134 is the apparatus of Example 129, comprising means for receiving a second S1 paging message comprising a second UE ID associated with a second UE, means for determining that the second UE is EC-capable based on an EC capability indicator comprised in the second S1 paging message, and means for paging the second UE using a short paging sequence based on receipt of the second S1 paging message and on a determination that an EC-mode (ECM) flag comprised in the second S1 paging message is set to indicate that the EC paging sequence is not to be used to page the second UE.

Example 135 is the apparatus of Example 134, the short paging sequence to comprise transmission of a single RRC paging message.

Example 136 is the apparatus of Example 134, the short paging sequence to comprise transmission of two or three RRC paging messages.

Example 137 is the apparatus of Example 129, comprising means for using the EC paging sequence to page a paging group comprising the UE and one or more additional UEs, and means for truncating the EC paging sequence based on the determination that the UE has responded to the RRC paging message and on a determination that each of the one or more additional UEs have also responded to RRC paging.

Example 138 is the apparatus of Example 129, comprising means for determining that the UE has responded to RRC paging in response to receipt of an RRCConnectionRequest message or an RRCConnectionSetupComplete message from the UE.

Example 139 is the apparatus of Example 129, comprising means for determining that the UE has responded to RRC paging in response to receipt of an S1 INITIAL CONTEXT SETUP REQUEST message from a mobility management entity (MME).

Example 140 is the apparatus of Example 129, comprising means for determining that the UE has responded to RRC paging in response to receipt of an S1 PAGING STOP message from a mobility management entity (MME).

Example 141 is the apparatus of Example 129, comprising means for paging the UE using a short paging sequence in response to receipt of the S1 paging message, means for paging the UE using the EC paging sequence in response to receipt of a second S1 paging message and the determination that the UE is EC-capable.

Example 142 is the apparatus of Example 141, the short paging sequence to comprise transmission of a single RRC paging message.

Example 143 is the apparatus of Example 141, the short paging sequence to comprise transmission of two or three RRC paging messages.

Example 144 is the apparatus of Example 141, comprising means for determining that the S1 paging message corresponds to an initial attempt to reach the UE based on an indicator comprised in the S1 paging message, and means for paging the UE using the short paging sequence in response to receipt of the S1 paging message and the determination that the S1 paging message corresponds to the initial attempt to reach the UE.

Example 145 is the apparatus of Example 144, the indicator to comprise a paging count value.

Example 146 is the apparatus of Example 144, the indicator to comprise a single-bit indicator.

Example 147 is the apparatus of Example 141, comprising means for determining that the second S1 paging message corresponds to a repeat attempt to reach the UE based on an indicator comprised in the second S1 paging message, and means for paging the UE using the EC paging sequence in response to receipt of the second S1 paging message and the determination that the second S1 paging message corresponds to the repeat attempt to reach the UE.

Example 148 is the apparatus of Example 147, the indicator to comprise a paging count value.

Example 149 is the apparatus of Example 147, the indicator to comprise a single-bit indicator.

Example 150 is a system, comprising an apparatus according to any of Examples 129 to 149, and at least one radio frequency (RF) transceiver.

Example 151 is the system of Example 150, comprising at least one RF antenna.

Example 152 is an apparatus, comprising at least one memory, and logic for a mobility management entity (MME), at least a portion of the logic comprised in hardware coupled to the at least one memory, the logic to receive an S1 capability information message comprising an indication that user equipment (UE) is extended coverage (EC)-capable, send an S1 paging message to instruct an evolved node B (eNB) to use an EC paging sequence to page the UE, and in response to a determination that the UE has responded to paging, send an S1 paging stop message to instruct the eNB to terminate the EC paging sequence.

Example 153 is the apparatus of Example 152, the logic to determine that the UE has responded to paging based on receipt of an S1 message from a second eNB.

Example 154 is the apparatus of Example 153, the S1 message received from the second eNB to comprise an S1 INITIAL UE MESSAGE message.

Example 155 is the apparatus of Example 152, the S1 paging message to comprise a UE identifier (ID) for the UE.

Example 156 is the apparatus of Example 152, the S1 paging message to comprise an EC capability indicator to indicate that the UE is EC-capable.

Example 157 is the apparatus of Example 152, the S1 paging message to comprise a parameter indicating that the EC paging sequence is to be used.

Example 158 is the apparatus of Example 157, the parameter to comprise a repetition count value indicating a same number of paging repetitions as are to be comprised in the EC paging sequence.

Example 159 is the apparatus of Example 157, the parameter to indicate that the S1 paging message comprises a repeat attempt to reach the UE.

Example 160 is the apparatus of Example 159, the parameter to comprise a paging count value.

Example 161 is the apparatus of Example 159, the parameter to comprise a single-bit indicator.

Example 162 is the apparatus of Example 152, the logic to determine to instruct the eNB to use the EC paging sequence to page the UE in response to a determination that the eNB serves a cell in which the UE was last known to be located.

Example 163 is the apparatus of Example 162, the S1 paging message to comprise a cell global identity (CGI) value corresponding to the cell.

Example 164 is the apparatus of Example 162, the S1 paging message to comprise an EC-mode (ECM) flag that is set to indicate that the EC paging sequence is to be used to page the UE.

Example 165 is the apparatus of Example 164, the logic to send a second S1 paging message to instruct a second eNB to use a short paging sequence to page the UE, the second S1 paging message to comprise an EC-mode flag that is set to indicate that the EC paging sequence is not to be used to page the UE.

Example 166 is the apparatus of Example 152, the logic to instruct the eNB to use a short paging sequence to page the UE, and based on a determination that the UE has not responded to paging during the short paging sequence, send the S1 paging message to instruct the eNB to use the EC paging sequence to page the UE.

Example 167 is the apparatus of Example 166, the short paging sequence to comprise transmission of a single RRC paging message.

Example 168 is the apparatus of Example 166, the short paging sequence to comprise transmission of two or three RRC paging messages.

Example 169 is the apparatus of Example 166, the logic to instruct the eNB to use the short paging sequence to page the UE by sending an S1 paging message comprising a UE identifier (ID) for the UE and a parameter indicating that the short paging sequence is to be used.

Example 170 is the apparatus of Example 169, the parameter to comprise a repetition count value indicating a same number of paging repetitions as are to be comprised in the short paging sequence.

Example 171 is the apparatus of Example 169, the parameter to comprise an indication of an initial attempt to reach the UE.

Example 172 is the apparatus of Example 171, the parameter to comprise a paging count value.

Example 173 is the apparatus of Example 171, the parameter to comprise a single-bit indicator.

Example 174 is a system, comprising an apparatus according to any of Examples 152 to 173, and at least one network interface.

Example 175 is at least one non-transitory computer-readable storage medium comprising a set of instructions that, in response to being executed at an evolved node B (eNB), cause the eNB to receive an S1 paging message comprising a user equipment (UE) identifier (ID) associated with a UE, page the UE using an extended coverage (EC) paging sequence based on receipt of the S1 paging message and on a determination that the UE is EC-capable, the EC paging sequence comprising a series of transmissions of a radio resource control (RRC) paging message, and truncate the EC paging sequence based on a determination that the UE has responded to RRC paging.

Example 176 is the at least one non-transitory computer-readable storage medium of Example 175, comprising instructions that, in response to being executed at the eNB, cause the eNB to determine that the UE is EC-capable based on an EC capability indicator comprised in the S1 paging message.

Example 177 is the at least one non-transitory computer-readable storage medium of Example 175, comprising instructions that, in response to being executed at the eNB, cause the eNB to page the UE using the EC paging sequence based on the receipt of the S1 paging message, the determination that the UE is EC-capable, and a determination that an EC-mode (ECM) flag comprised in the S1 paging message is set to indicate that the EC paging sequence is to be used to page the UE.

Example 178 is the at least one non-transitory computer-readable storage medium of Example 175, comprising instructions that, in response to being executed at the eNB, cause the eNB to select a number of paging repetitions to be comprised in the EC paging sequence based on one or more signal measurements comprised in the S1 paging message.

Example 179 is the at least one non-transitory computer-readable storage medium of Example 175, comprising instructions that, in response to being executed at the eNB, cause the eNB to identify a number of paging repetitions to be comprised in the EC paging sequence based on a repetition count value comprised in the S1 paging message.

Example 180 is the at least one non-transitory computer-readable storage medium of Example 175, comprising instructions that, in response to being executed at the eNB, cause the eNB to receive a second S1 paging message comprising a second UE ID associated with a second UE, determine that the second UE is EC-capable based on an EC capability indicator comprised in the second S1 paging message, and page the second UE using a short paging sequence based on receipt of the second S1 paging message and on a determination that an EC-mode (ECM) flag comprised in the second S1 paging message is set to indicate that the EC paging sequence is not to be used to page the second UE.

Example 181 is the at least one non-transitory computer-readable storage medium of Example 180, the short paging sequence to comprise transmission of a single RRC paging message.

Example 182 is the at least one non-transitory computer-readable storage medium of Example 180, the short paging sequence to comprise transmission of two or three RRC paging messages.

Example 183 is the at least one non-transitory computer-readable storage medium of Example 175, comprising instructions that, in response to being executed at the eNB, cause the eNB to use the EC paging sequence to page a paging group comprising the UE and one or more additional UEs, and truncate the EC paging sequence based on the determination that the UE has responded to the RRC paging message and on a determination that each of the one or more additional UEs have also responded to RRC paging.

Example 184 is the at least one non-transitory computer-readable storage medium of Example 175, comprising instructions that, in response to being executed at the eNB, cause the eNB to determine that the UE has responded to RRC paging in response to receipt of an RRCConnection-Request message or an RRCConnectionSetupComplete message from the UE.

Example 185 is the at least one non-transitory computer-readable storage medium of Example 175, comprising instructions that, in response to being executed at the eNB, cause the eNB to determine that the UE has responded to RRC paging in response to receipt of an S1 INITIAL CONTEXT SETUP REQUEST message from a mobility management entity (MME).

Example 186 is the at least one non-transitory computer-readable storage medium of Example 175, comprising instructions that, in response to being executed at the eNB, cause the eNB to determine that the UE has responded to RRC paging in response to receipt of an S1 PAGING STOP message from a mobility management entity (MME).

Example 187 is the at least one non-transitory computer-readable storage medium of Example 175, comprising instructions that, in response to being executed at the eNB, cause the eNB to page the UE using a short paging sequence in response to receipt of the S1 paging message, and page the UE using the EC paging sequence in response to receipt of a second S1 paging message and the determination that the UE is EC-capable.

Example 188 is the at least one non-transitory computer-readable storage medium of Example 187, the short paging sequence to comprise transmission of a single RRC paging message.

Example 189 is the at least one non-transitory computer-readable storage medium of Example 187, the short paging sequence to comprise transmission of two or three RRC paging messages.

Example 190 is the at least one non-transitory computer-readable storage medium of Example 187, comprising instructions that, in response to being executed at the eNB, cause the eNB to determine that the S1 paging message corresponds to an initial attempt to reach the UE based on an indicator comprised in the S1 paging message, and page the UE using the short paging sequence in response to receipt of the S1 paging message and the determination that the S1 paging message corresponds to the initial attempt to reach the UE.

Example 191 is the at least one non-transitory computer-readable storage medium of Example 190, the indicator to comprise a paging count value.

Example 192 is the at least one non-transitory computer-readable storage medium of Example 190, the indicator to comprise a single-bit indicator.

Example 193 is the at least one non-transitory computer-readable storage medium of Example 187, comprising instructions that, in response to being executed at the eNB, cause the eNB to determine that the second S1 paging message corresponds to a repeat attempt to reach the UE based on an indicator comprised in the second S1 paging message, and page the UE using the EC paging sequence in response to receipt of the second S1 paging message and the determination that the second S1 paging message corresponds to the repeat attempt to reach the UE.

Example 194 is the at least one non-transitory computer-readable storage medium of Example 193, the indicator to comprise a paging count value.

Example 195 is the at least one non-transitory computer-readable storage medium of Example 193, the indicator to comprise a single-bit indicator.

Example 196 is a method, comprising receiving, at a mobility management entity (MME), an S1 capability information message comprising an indication that user equipment (UE) is extended coverage (EC)-capable, sending an S1 paging message to instruct an evolved node B (eNB) to use an EC paging sequence to page the UE, and in response to a determination, by processing circuitry at the MME, that the UE has responded to paging, sending an S1 paging stop message to instruct the eNB to terminate the EC paging sequence.

Example 197 is the method of Example 196, comprising determining that the UE has responded to paging based on receipt of an S1 message from a second eNB.

Example 198 is the method of Example 197, the S1 message received from the second eNB to comprise an S1 INITIAL UE MESSAGE message.

Example 199 is the method of Example 196, the S1 paging message to comprise a UE identifier (ID) for the UE.

Example 200 is the method of Example 196, the S1 paging message to comprise an EC capability indicator to indicate that the UE is EC-capable.

Example 201 is the method of Example 196, the S1 paging message to comprise a parameter indicating that the EC paging sequence is to be used.

Example 202 is the method of Example 201, the parameter to comprise a repetition count value indicating a same number of paging repetitions as are to be comprised in the EC paging sequence.

Example 203 is the method of Example 201, the parameter to indicate that the S1 paging message comprises a repeat attempt to reach the UE.

Example 204 is the method of Example 203, the parameter to comprise a paging count value.

Example 205 is the method of Example 203, the parameter to comprise a single-bit indicator.

Example 206 is the method of Example 196, comprising determining to instruct the eNB to use the EC paging sequence to page the UE in response to a determination that the eNB serves a cell in which the UE was last known to be located.

Example 207 is the method of Example 206, the S1 paging message to comprise a cell global identity (CGI) value corresponding to the cell.

Example 208 is the method of Example 206, the S1 paging message to comprise an EC-mode (ECM) flag that is set to indicate that the EC paging sequence is to be used to page the UE.

Example 209 is the method of Example 208, comprising sending a second S1 paging message to instruct a second eNB to use a short paging sequence to page the UE, the second S1 paging message to comprise an EC-mode flag that is set to indicate that the EC paging sequence is not to be used to page the UE.

Example 210 is the method of Example 196, comprising instructing the eNB to use a short paging sequence to page the UE, and based on a determination that the UE has not responded to paging during the short paging sequence, sending the S1 paging message to instruct the eNB to use the EC paging sequence to page the UE.

Example 211 is the method of Example 210, the short paging sequence to comprise transmission of a single RRC paging message.

Example 212 is the method of Example 210, the short paging sequence to comprise transmission of two or three RRC paging messages.

Example 213 is the method of Example 210, comprising instructing the eNB to use the short paging sequence to page the UE by sending an S1 paging message comprising a UE identifier (ID) for the UE and a parameter indicating that the short paging sequence is to be used.

Example 214 is the method of Example 213, the parameter to comprise a repetition count value indicating a same number of paging repetitions as are to be comprised in the short paging sequence.

Example 215 is the method of Example 213, the parameter to comprise an indication of an initial attempt to reach the UE.

Example 216 is the method of Example 215, the parameter to comprise a paging count value.

Example 217 is the method of Example 215, the parameter to comprise a single-bit indicator.

Example 218 is at least one non-transitory computer-readable storage medium comprising a set of instructions that, in response to being executed on a computing device, cause the computing device to perform a method according to any of Examples 196 to 217.

Example 219 is an apparatus, comprising means for performing a method according to any of Examples 196 to 217.

Example 220 is a system, comprising the apparatus of Example 219, and at least one radio frequency (RF) transceiver.

Example 221 is the system of Example 220, comprising at least one RF antenna.

Example 222 is an apparatus, comprising means for sending, from extended coverage (EC)-capable user equipment (UE) in a connected state, a capability information message comprising an EC capability indicator, means for transitioning the EC-capable UE into an idle state, and means for triggering a procedure to notify a serving evolved node B (eNB) of the cell that the EC-capable UE is located in the EC region of the cell in response to a determination that the EC-capable UE has entered an EC region of a cell since transitioning into the idle state.

Example 223 is the apparatus of Example 222, the capability information message to comprise a radio resource control (RRC) UECapabilityInformation message.

Example 224 is the apparatus of Example 222, the EC-capable UE to comprise a limited-capability type (LCT) UE.

Example 225 is the apparatus of Example 224, the capability information message to comprise the EC capability indicator and LCT information to indicate that the EC-capable UE comprises an LCT UE.

Example 226 is the apparatus of Example 225, the capability information message to comprise a radio resource control (RRC) UECapabilityInformation message, the LCT information to comprise a Category 0 indicator or a Category M indicator.

Example 227 is the apparatus of Example 222, the procedure to comprise a Tracking Area Update procedure.

Example 228 is the apparatus of Example 222, the procedure to comprise a Service Request procedure.

Example 229 is the apparatus of Example 222, comprising means for determining that the EC-capable UE has entered the EC region of the cell based on one or more signal measurements for the cell.

Example 230 is the apparatus of Example 222, comprising means for determining that the EC-capable UE has entered the EC region of the cell based on a determination that the EC-capable UE has entered the cell from an EC region of a second cell.

Example 231 is a system, comprising an apparatus according to any of Examples 222 to 230, and at least one radio frequency (RF) transceiver.

Example 232 is the system of Example 231, comprising at least one RF antenna.

Example 233 is the system of Example 232, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic for an evolved node B (eNB), at least a portion of the logic comprised in hardware coupled to the at least one memory, the logic to:
      receive an S1 paging message comprising a user equipment (UE) identifier (ID) associated with a UE and an extended coverage (EC) capability indicator indicating that the UE is EC-capable;
      page the UE using an EC paging sequence based on receipt of the S1 paging message, the EC paging sequence to comprise a series of transmissions of a radio resource control (RRC) paging message; and
      truncate the EC paging sequence based on a determination that the UE has responded to RRC paging.

2. The apparatus of claim 1, the logic to page the UE using the EC paging sequence in response to a determination that an EC-mode (ECM) flag comprised in the S1 paging message is set to indicate that the EC paging sequence is to be used to page the UE.

3. The apparatus of claim 1, the logic to page the UE using the EC paging sequence in response to a determination that a paging count value comprised in the S1 paging message indicates that the S1 paging message corresponds to a repeat attempt to reach the UE.

4. The apparatus of claim 1, the logic to identify a number of paging repetitions to be comprised in the EC paging sequence based on a repetition count value comprised in the S1 paging message.

5. The apparatus of claim 1, the logic to determine that the UE has responded to RRC paging in response to receipt of an RRCConnectionRequest message or an RRCConnectionSetupComplete message from the UE.

6. The apparatus of claim 1, the logic to determine that the UE has responded to RRC paging in response to receipt of an S1 INITIAL CONTEXT SETUP REQUEST message from a mobility management entity (MME).

7. The apparatus of claim 1, the logic to determine that the UE has responded to RRC paging in response to receipt of an S1 PAGING STOP message from a mobility management entity (MME).

8. The apparatus of claim 1, the logic to:
   receive a second S1 paging message comprising a second UE ID associated with a second UE and an EC capability indicator indicating that the second UE is EC-capable;
   page the second UE using a short paging sequence in response to:
      a determination that a paging count value comprised in the second S1 paging message indicates that the second S1 paging message corresponds to an initial attempt to reach the second UE; or a determination that an EC-mode (ECM) flag comprised in the second S1 paging message is set to indicate that the EC paging sequence is not to be used to page the second UE.

9. A system, comprising:
the apparatus of claim 1; and
at least one radio frequency (RF) transceiver.

10. An apparatus, comprising:
at least one memory; and
logic for a mobility management entity (MME), at least a portion of the logic comprised in hardware coupled to the at least one memory, the logic to:
receive an S1 capability information message comprising an indication that user equipment (UE) is extended coverage (EC)-capable;
send an S1 paging message to instruct an evolved node B (eNB) to use an EC paging sequence to page the UE; and
in response to a determination that the UE has responded to paging, send an S1 paging stop message to instruct the eNB to terminate the EC paging sequence.

11. The apparatus of claim 10, the logic to determine that the UE has responded to paging based on receipt of an S1 message from a second eNB.

12. The apparatus of claim 10, the S1 paging message to comprise a parameter indicating that the EC paging sequence is to be used.

13. The apparatus of claim 12, the parameter to indicate that the S1 paging message comprises a repeat attempt to reach the UE.

14. The apparatus of claim 10, the logic to determine to instruct the eNB to use the EC paging sequence to page the UE in response to a determination that the eNB serves a cell in which the UE was last known to be located.

15. The apparatus of claim 14, the S1 paging message to comprise an EC-mode (ECM) flag that is set to indicate that the EC paging sequence is to be used to page the UE.

16. The apparatus of claim 15, the logic to send a second S1 paging message to instruct a second eNB to use a short paging sequence to page the UE, the second S1 paging message to comprise an EC-mode flag that is set to indicate that the EC paging sequence is not to be used to page the UE.

17. The apparatus of claim 10, the logic to:
instruct the eNB to use a short paging sequence to page the UE; and
based on a determination that the UE has not responded to paging during the short paging sequence, send the S1 paging message to instruct the eNB to use the EC paging sequence to page the UE.

18. An apparatus, comprising:
at least one memory; and
logic, at least a portion of which is in hardware coupled to the at least one memory, the logic to:
send, from extended coverage (EC)-capable user equipment (UE) in a connected mode, a capability information message comprising an EC capability indicator;
transition the EC-capable UE into an idle mode; and
in response to a determination that the EC-capable UE has entered an EC region of a cell since transitioning into the idle mode, trigger a procedure to notify a serving evolved node B (eNB) of the cell that the EC-capable UE is located in the EC region of the cell.

19. The apparatus of claim 18, the capability information message to comprise a radio resource control (RRC) UECapabilitylnformation message.

20. The apparatus of claim 18, the EC-capable UE to comprise a limited-capability type (LCT) UE.

21. The apparatus of claim 20, the capability information message to comprise the EC capability indicator and LCT information to indicate that the EC-capable UE comprises an LCT UE.

22. The apparatus of claim 21, the capability information message to comprise a radio resource control (RRC) UECapabilitylnformation message, the LCT information to comprise a Category 0 indicator or a Category M indicator.

23. The apparatus of claim 18, the procedure to comprise a Tracking Area Update procedure or a Service Request procedure.

24. The apparatus of claim 18, the logic to determine that the EC-capable UE has entered the EC region of the cell based on one or more signal measurements for the cell.

25. The apparatus of claim 18, the logic to determine that the EC-capable UE has entered the EC region of the cell based on a determination that the EC-capable UE has entered the cell from an EC region of a second cell.

* * * * *